United States Patent
Patel et al.

(10) Patent No.: US 11,288,005 B2
(45) Date of Patent: Mar. 29, 2022

(54) METHOD AND SYSTEM FOR GENERATING COMPLIANCE AND SEQUENCE AWARE REPLICATION IN A MULTIPLE DATA CLUSTER SYSTEM

(71) Applicant: Dell Products L.P., Hopkinton, MA (US)

(72) Inventors: Dharmesh M. Patel, Round Rock, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/994,453

(22) Filed: Aug. 14, 2020

(65) Prior Publication Data

US 2022/0050595 A1    Feb. 17, 2022

(51) Int. Cl.
*G06F 12/00* (2006.01)
*G06F 3/06* (2006.01)
*G06F 11/14* (2006.01)

(52) U.S. Cl.
CPC .............. *G06F 3/065* (2013.01); *G06F 3/067* (2013.01); *G06F 3/0619* (2013.01); *G06F 3/0653* (2013.01); *G06F 3/0683* (2013.01); *G06F 11/1435* (2013.01); *G06F 11/1451* (2013.01); *G06F 11/1464* (2013.01); *G06F 11/1469* (2013.01)

(58) Field of Classification Search
None
See application file for complete search history.

(56) References Cited

U.S. PATENT DOCUMENTS

| | | | |
|---|---|---|---|
| 6,151,688 A | 11/2000 | Wipfel et al. | |
| 8,640,137 B1 | 1/2014 | Bostic et al. | |
| 9,621,643 B1 | 4/2017 | Emelyanov | |
| 10,015,106 B1 | 7/2018 | Florissi et al. | |
| 2003/0182264 A1 | 9/2003 | Wilding et al. | |
| 2004/0153866 A1 | 8/2004 | Guimbellot et al. | |
| 2007/0156733 A1 | 7/2007 | Meyerson | |
| 2008/0256018 A1 | 10/2008 | Chaudhury et al. | |
| 2011/0208737 A1 | 8/2011 | Shmueli et al. | |
| 2011/0258161 A1 * | 10/2011 | Constantinescu ... | H04L 41/0823 707/640 |
| 2012/0254175 A1 * | 10/2012 | Horowitz ............... | G06F 16/278 707/737 |
| 2013/0297770 A1 | 11/2013 | Zhang | |
| 2016/0048415 A1 | 2/2016 | Sarma et al. | |
| 2017/0289316 A1 * | 10/2017 | Solis ................ | H04L 29/08072 |

* cited by examiner

*Primary Examiner* — Daniel D Tsui
(74) *Attorney, Agent, or Firm* — Chamberlain, Hrdlicka, White, Williams & Aughtry

(57) ABSTRACT

This application includes a method that is performed store data. The method includes obtaining, by a compliance aware replicator (CAR), a replication request to replicate data; and in response to the replication request: obtaining data chunks, associated with the data, using sequence identifiers of sequencing metadata; replicating the data chunks to obtain replicated data chunks; identifying, using classification metadata associated with the data, a first data cluster of data clusters to store the replicated data chunks; and sending the replicated data chunks to the first data cluster.

20 Claims, 18 Drawing Sheets

US 11,288,005 B2

METHOD AND SYSTEM FOR GENERATING COMPLIANCE AND SEQUENCE AWARE REPLICATION IN A MULTIPLE DATA CLUSTER SYSTEM

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method performed to access data nodes of a data cluster. The method includes obtaining, by a compliance aware replicator (CAR), a replication request to replicate data; and in response to the replication request: obtaining data chunks, associated with the data, using sequence identifiers of sequencing metadata; replicating the data chunks to obtain replicated data chunks; identifying, using classification metadata associated with the data, a first data cluster of data clusters to store the replicated data chunks; and sending the replicated data chunks to the first data cluster.

In general, in one aspect, the invention relates to a system that is used to access data nodes of a data cluster. The system includes a processor; and a compliance aware replicator (CAR), which when executed by the processor preforms a method. The method includes obtaining, by a compliance aware replicator (CAR), a replication request to replicate data; and in response to the replication request: obtaining data chunks, associated with the data, using sequence identifiers of sequencing metadata; replicating the data chunks to obtain replicated data chunks; identifying, using classification metadata associated with the data, a first data cluster of data clusters to store the replicated data chunks; and sending the replicated data chunks to the first data cluster.

In general, in one aspect, the invention relates to a non-transitory computer readable medium which includes computer readable program code, which when executed by a computer processor enables the computer processor to perform a method for storing data. The method includes obtaining, by a compliance aware replicator (CAR), a replication request to replicate data; and in response to the replication request: obtaining data chunks, associated with the data, using sequence identifiers of sequencing metadata; replicating the data chunks to obtain replicated data chunks; identifying, using classification metadata associated with the data, a first data cluster of data clusters to store the replicated data chunks; and sending the replicated data chunks to the first data cluster.

DETAILED DESCRIPTION

Figure 1A:
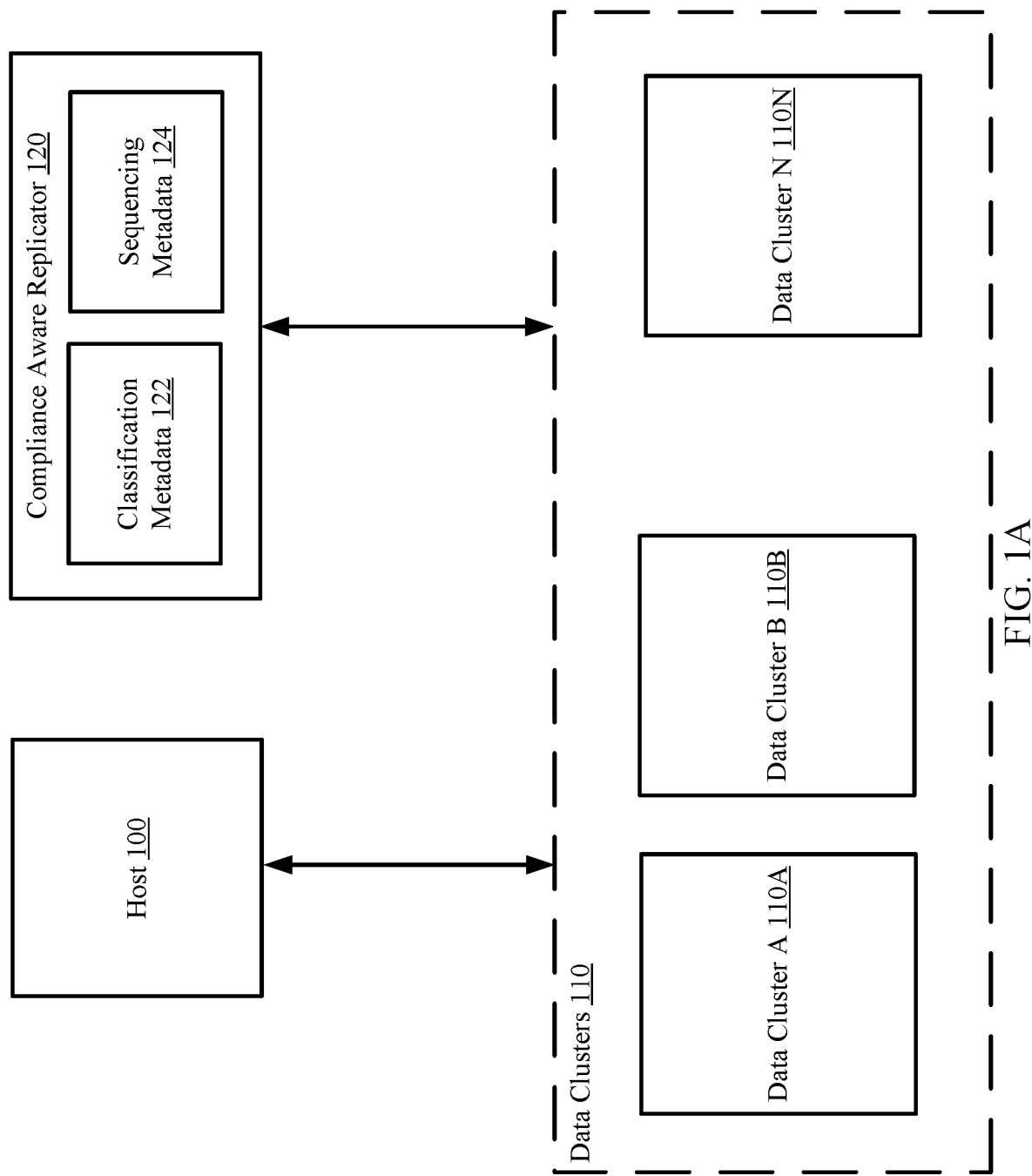
FIG. 1A shows a diagram of a system in accordance with one or more embodiments of the invention.

Specific embodiments of the invention will now be described in detail with reference to the accompanying figures. Like elements in the various figures are denoted by like reference numerals for consistency. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for servicing requests in a multiple data cluster system using a compliance aware replicator (CAR). More specifically, embodiments of the invention relate to replicating data chunks of associated with objects stored in data clusters and storing the replicated data chunks in data clusters that follow compliance requirements. A classification engine may generate classification identifiers and provide the classification identifiers to a data processor. When storing data chunks of a data object, the data processor may associate classification identifiers and sequencing metadata with the data chunks. The CAR may then obtain the data chunks using the sequencing metadata, replicate the data chunks, and store the replicated data chunks in data cluster that is associated with a classification identifier in the order specified by the sequencing metadata.

FIG. 1A shows a diagram of a system in accordance with one or more embodiments of the invention. The system includes a host (100), data clusters (110), and a compliance aware replicator (CAR) (120). The host (100) is operably connected to the data cluster (110) via any combination of wired and/or wireless connections. The system may include additional, fewer, and/or different components without departing from the invention. Each component may be operably connected to any of the other components via any combination of wired and/or wireless connections. Each of the aforementioned components is discussed below.

In one or more embodiments of the invention, the host (100) utilizes the data cluster (110) to store data. The data stored may be backups of databases, files, applications, and/or other types of data without departing from the invention. In utilizing the data cluster (110), the host (100) may also access data stored in the data cluster (110). The host (100) may send requests to the data cluster (110) to access data within the data cluster (110). The requests may include write requests. A write request may refer to a request sent by the host (100) to the data cluster (110) to write and/or store data in the data cluster (110). The requests may include other and/or additional requests without departing from the invention.

Figure 5:
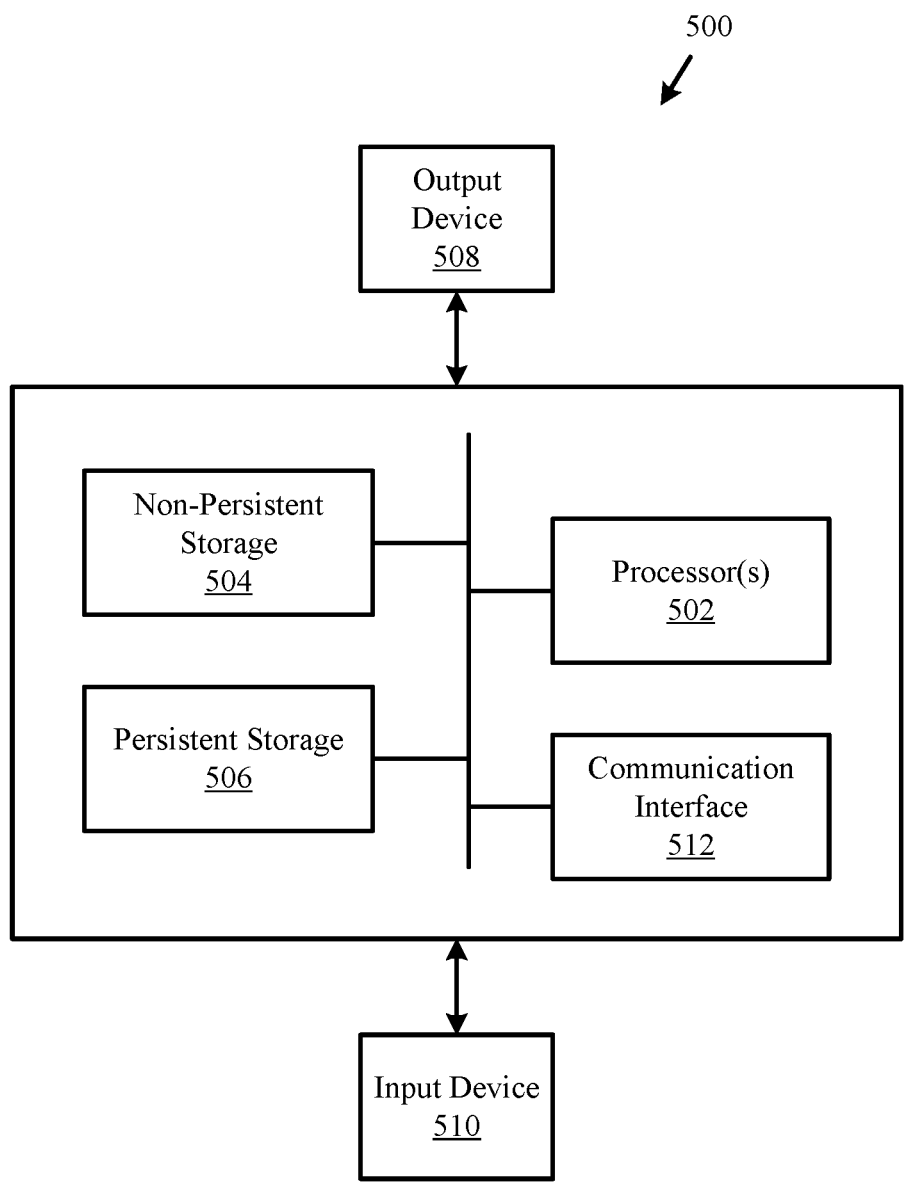
FIG. 5 shows a diagram of a computing device in accordance with one or more embodiments of the invention.

Continuing with the discussion of FIG. 1A, in one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data clusters (110) store data, metadata, and/or backups of data generated by the host (100). The data and/or backups may be deduplicated versions of data obtained from the host. The data clusters may, via an erasure coding procedure, store portions of the deduplicated data across data nodes operating in the data clusters (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In one or more embodiments of the invention, an erasure coding procedure includes dividing the obtained data into portions, referred to as data chunks. Each data chunk may include any number of data segments associated with the obtained data. The individual data chunks may then be combined (or otherwise grouped) into data slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. The chunks of a data slice may then be stored across different data nodes in a data cluster. Any chunk within a data slice may be reconstructed using the other chunks in the data slice. Non-limiting examples of erasure coding algorithms are RAID-3, RAID-4, RAID-5, and RAID-6. Other erasing coding algorithms may be used without departing from the invention.

Continuing with the discussion of FIG. 1A, the data clusters (110) may include persistent storage devices found within data nodes that each store any number of portions of data. The portions of data may be obtained by other persistent storage devices, other data nodes, other data clusters, and/or from the host (100). The data clusters (110) may include any number of data clusters (e.g., data cluster A (110A), data cluster B (110B), data cluster N (110N)). For additional details regarding the data clusters (110), see, e.g., FIGS. 1B-1C.

In one or more embodiments of the invention, compliance aware replicator (CAR) (120) is a device (physical or logical) that includes the functionality to generated replicated data chunks associated with objects stored in the data clusters (110) and store the replicated chunks in other data clusters that follow compliance requirements. An object may be a file. The CAR (120) may determine a data cluster (e.g., 110A) of the data clusters (110) to store replicated data chunks based on classification metadata (122) obtained from a data processor (e.g., 112, FIG. 1B). The classification metadata (122) may include all or a portion of the classification metadata of the classification metadata repository (132, FIG. 1B) (discussed below). The CAR (120) may obtain data chunks associated with an object and write replicated data chunks based on sequencing metadata (124). The sequencing metadata (124) may specify a specific order associated with the data chunks and replicated data chunks. The CAR (120) may include other and/or additional functionality without departing from the invention.

In one or more embodiments of the invention, the sequencing metadata (124) specifies orders of data chunks stored in data clusters. The sequencing metadata (124) may include a list of object identifiers (not shown) associated with the objects from which data chunks were generated. The sequencing metadata (124) may also include data cluster identifiers associated with the list of object identifiers. The data cluster identifiers may specify the data cluster in which data chunks of objects are stored. An object identifier may be a bit a unique global bit string associated with an object. The object identifiers may be generated by the host (100) and sent to the data processor (e.g., 112, FIG. 1B) where it is included in the sequencing metadata (124). For each object identifier, the sequencing metadata (124) may include any number of sequence identifiers (not shown). A sequence identifier may be a number that represents the place of a data chunk in a specific order of data chunks. Each data chunk may be associated with a sequence identifier. The data processor (e.g., 112, FIG. 1B) may generate sequence identifiers and include the sequence identifiers in the data chunks and in sequencing metadata (124). The sequencing metadata (124) may be used by the CAR (120) to obtain and store replicated data chunks in a specific order. The sequencing metadata (124) may include other and/or additional information and may be used for other and/or additional purposes without departing from the invention.

The sequencing metadata may be associated with the classification identifier and included in the data chunks of the processed object as discussed above. Including the sequencing metadata may classification identifier and the data chunks may minimize the metadata mapping required by the CAR (120) and/or the data processor (discussed below) to obtain the data chunks during replication. The sequencing metadata may include a data cluster identifier that enables the CAR (120) to identify the data cluster in which the data chunks to be replicated are stored. The CAR (120) may then obtain the data chunks that include sequence identifiers that match the sequence identifiers of the sequencing metadata included with the replication request. By appending the sequence identifiers to the data chunks along with the classification identifiers, the CAR (120) may not be required to generate or obtain from the data processor system wide metadata mappings that track the storage locations of data chunks stored in the system, thereby decreasing computational overhead associated with metadata mappings.

In one or more embodiments of the invention, the CAR (120) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the CAR (120) described throughout this application and all or a portion of the method illustrated in FIGS. 3F-3G.

In one or more embodiments of the invention, the CAR (120) is implemented as a logical device. The logical device may utilize the computing resources of any number of computing devices and thereby provide the functionality of the CAR (120) described throughout this application and all or a portion of the method illustrated in FIGS. 3F-3G.

Figure 1B:
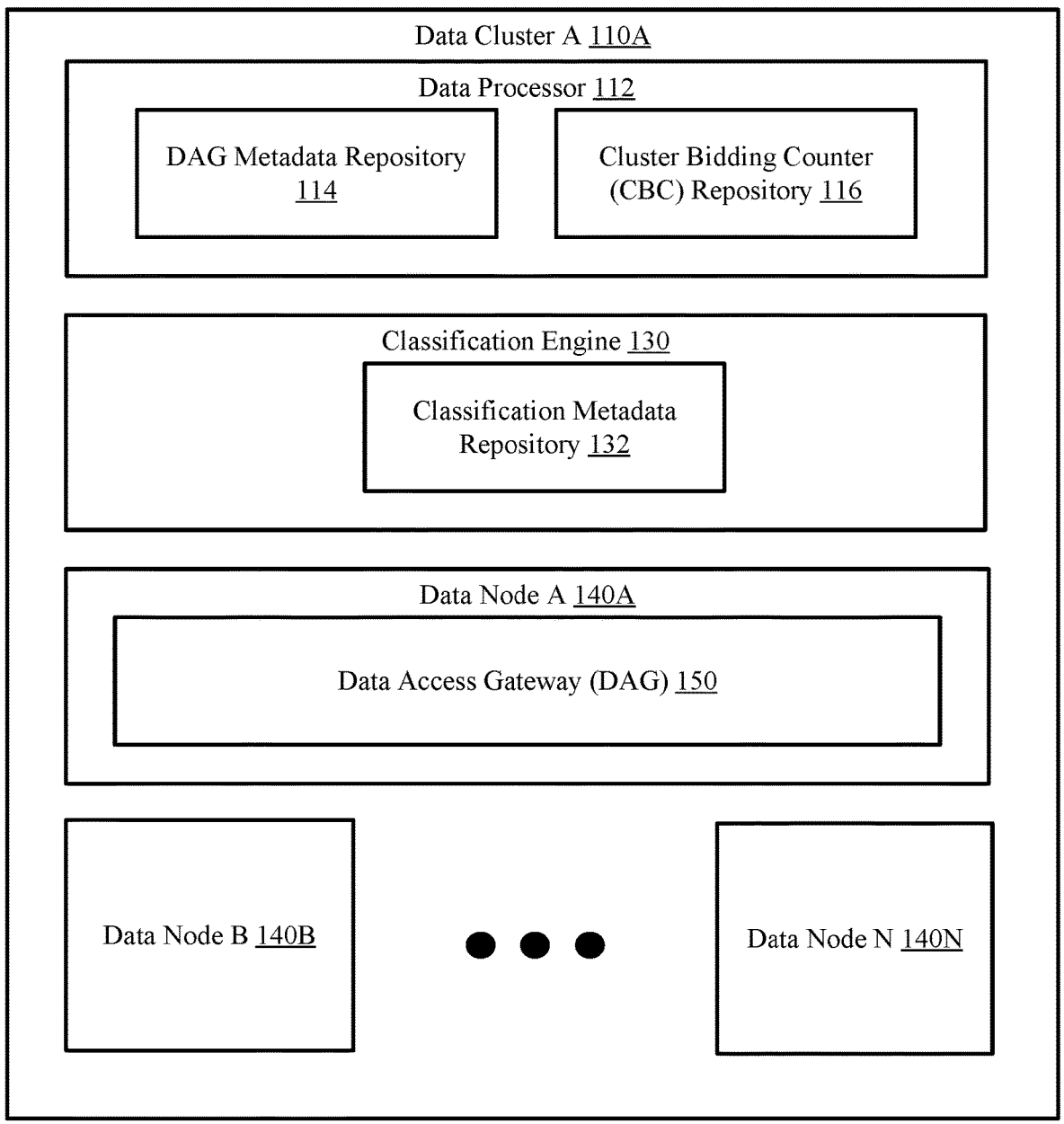
FIG. 1B shows a diagram of a data cluster without an accelerator pool in accordance with one or more embodiments of the invention.

FIG. 1B shows a diagram of a data cluster without an accelerator pool in accordance with one or more embodiments of the invention. The data cluster (110A) may be an embodiment of the data cluster (110, FIG. 1A) discussed above. Data cluster A (110A) may include a data processor (112), a classification engine (130) and any number of data nodes (140A, 140B, 140N). The components of data cluster A (110A) may be operably connected via any combination of wired and/or wireless connections. Each of the aforementioned components is discussed below.

In one or more embodiments of the invention, the data processor (112) is a device (physical or logical) that includes the functionality to register DAGs of data clusters (110) and update the DAG metadata repository (114) based on DAG metadata obtained from the DAGs. The data processor may also process objects associated with requests to generate data chunks and generate sequence identifiers associated with the data chunks. The data processor (112) may also determine data clusters to service requests using cluster bidding counters (CBCs) of the CBC repository (116) and DAG metadata of the DAG metadata repository (114). For additional information regarding the cluster bidding counter (CBC) repository (116) and the DAG metadata repository (114), refer to FIGS. 2A and 2B respectively. The data processor may also associate classification identifiers obtained from the classification engine (130) with data chunks associated with requests. The data processor may include the functionality to perform the methods illustrated in FIGS. 3A-3E. The data processor (112) may include other and/or additional functionality without departing from the invention.

In one or more of embodiments of the invention, the data processor (112) is implemented as computer instructions, e.g., computer code, stored on a persistent storage device of a data node (e.g., 140A, 140B, 140N) that when executed by a processor of a data node (e.g., 140A, 140B, 140N) cause the data node (e.g., 140A, 140B, 140N) to provide the aforementioned functionality of the data processor (112) described throughout this application.

In one or more embodiments of the invention, the data processor (112) is implemented as a computing device (see e.g., FIG. 5), is operatively connected to (but separate from) the data nodes (e.g., 140A, 140B, 140N) in the data cluster. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (112) described throughout this application.

In one or more embodiments of the invention, the data processor (112) is implemented as a logical device. The logical device may utilize the computing resources of any number of computing devices and thereby provide the functionality of the data processor (112) described throughout this application.

In one or more embodiments of the invention, the classification engine (130) is a device (physical or logical) that includes the functionality to: (i) obtain compliance information from the host (100), (ii) generate classification identifiers based on compliance information, (iii) update a classification metadata repository (132) based on classification identifiers, and (iv) provide classification identifiers to the data processor (112). The classification engine may include the functionality to perform the methods illustrated in FIG. 3C. The classification engine (130) may include other and/or additional functionality without departing from the invention.

In one or more of embodiments of the invention, the classification engine (130) is implemented as computer instructions, e.g., computer code, stored on a persistent storage device of a data node (e.g., 140A, 140B, 140N) that when executed by a processor of a data node (e.g., 140A, 140B, 140N) cause the data node (e.g., 140A, 140B, 140N) to provide the aforementioned functionality of the classification engine (130) described throughout this application.

In one or more embodiments of the invention, the classification engine (130) is implemented as a computing device (see e.g., FIG. 5), is operatively connected to (but separate from) the data nodes (e.g., 140A, 140B, 140N) in the data cluster. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the classification engine (130) described throughout this application.

In one or more embodiments of the invention, the classification engine (130) is implemented as a logical device. The logical device may utilize the computing resources of any number of computing devices and thereby provide the functionality of the classification engine (130) described throughout this application.

The classification metadata repository (132) may be one or more data structures that may be used to specify data clusters that may be able to store replications of data chunks stored in the data clusters (110, FIG. 1A). The classification metadata repository (132) may include classification metadata, which may include compliance information and classification identifiers (both not shown). The classification metadata repository (132) may include other and/or additional information without departing from the invention. Each of the components of the classification metadata repository (132) is discussed below.

In one or more embodiments of the invention, compliance information is one or more data structures that specify compliance requirements or guidelines for data stored in the system. The compliance requirements may include, for example, storing replicated data chunks associated with specific objects in certain data clusters that are in a specific geographic location. The compliance information may also specify a number of replications to perform. The compliance information may include other and/or additional compliance requirements without departing from the invention. The compliance information may also include object identifiers associated with specific compliance information. The compliance information may be obtained by the classification engine (130) from the host (100, FIG. 1A). The compliance information may be used by the classification engine (130) to generate classification identifiers. The compliance information may include other and/or additional information and may be used for other and/or additional purposes without departing from the invention.

In one or more embodiments of the invention, the classification identifiers may be one or more data structures that specify data clusters (110, FIG. 1A) that are able to store replicated data chunks in accordance with compliance requirements specified in the compliance information. The classification identifiers may include a combination of the data cluster identifiers discussed throughout this application. The classification identifiers may be generated by the classification engine (130) based on compliance information obtained from the host (100, FIG. 1A) as discussed above. The classification identifiers may be used by the CAR (120, FIG. 1A) to determine the data cluster(s) (e.g., 110A, FIG. 1A) to store replicated data chunks. The classification identifiers may include other and/or additional information and may be used for other and/or additional purposes without departing from the invention.

In one or more embodiments of the invention, the data nodes (140A, 140B, 140N) store data chunks and/or parity chunks. The data nodes (140A, 140B, 140N) may include persistent storage that may be used to store the data chunks and parity chunks. The data nodes (140A, 140B, 140N) may also service requests for the host (100, FIG. 1A). The data nodes (140A, 140B, 140N) may also include the functionality to generate and provide to the DAG (150) discovery metadata, bidding counters, and metadata mappings. The data nodes (140A, 140B, 140N) may also include the functionality to perform the DAG operations if selected to do so by the data processor (112). The data nodes (140A, 140B, 140N) may include other and/or additional functionality without departing from the invention.

In one or more embodiments of the invention, each data node (140A, 140B, 140N) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, which when executed by the processor(s) of the computing device cause the computing device to perform the functionality of the data node (140A, 140B, 140N) described throughout this application.

In one or more embodiments of the invention, each of the data nodes (140A, 140B, 140N) is implemented as a logical device. The logical device may utilize the computing resources of any number of computing devices and thereby provide the functionality of the data nodes (140A, 140B, 140N) described throughout this application. For additional details regarding the data nodes (140A, 140B, 140N), see, e.g., FIG. 1D-1E.

Figure 1C:
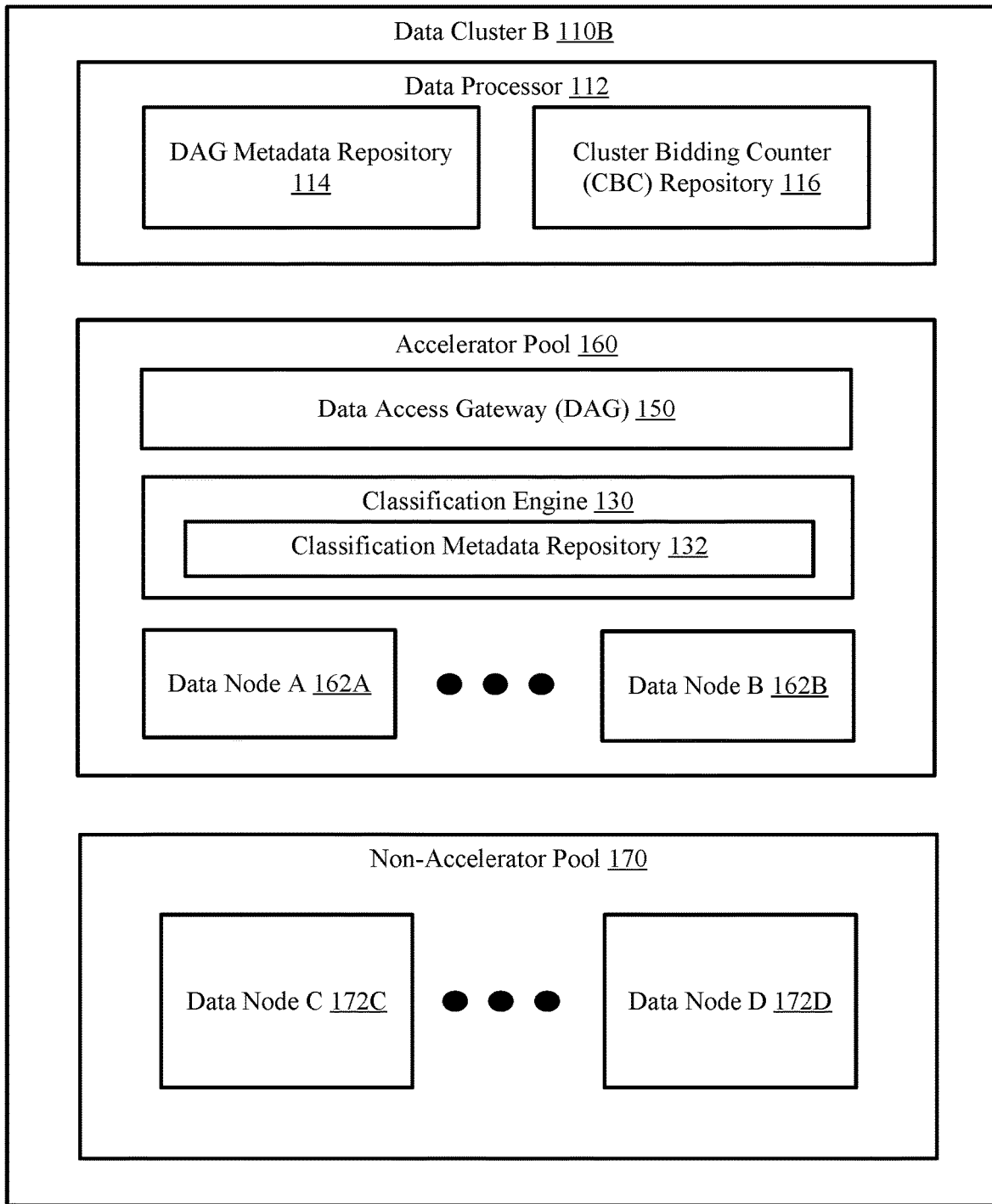
FIG. 1C shows a diagram of a data cluster with an accelerator pool in accordance with one or more embodiments of the invention.

FIG. 1C shows a diagram of a data cluster (110B) with an accelerator pool in accordance with one or more embodiments of the invention. The data cluster (110B) may be an embodiment a data cluster (e.g., data cluster B (110B)) of the data clusters (110, FIG. 1A) discussed above. Data cluster (110B) may include a data processor (112), a classification engine (130), an accelerator pool (160), and a non-accelerator pool (170). The accelerator pool (160) may include a data access gateway (DAG) (150) and any number of data nodes (162A, 162B). Similarly, the non-accelerator pool (170) includes any number of data nodes (172C, 172D). The components of data cluster B (110B) may be operably connected via any combination of wired and/or wireless connections. Each of the aforementioned components is discussed below.

The data processor (112) may be an embodiment of the data processor (112, FIG. 1B). For additional information regarding the data processor (112) refer to e.g., FIG. 1B.

In one or more embodiments of the invention, the DAG (150) is a device that includes functionality to determine a data node (e.g., 162A, 162B, 172C, 172D) of data cluster B (110B) to service (or process) a request from a host (e.g., 100, FIG. 1A). The DAG (150) may perform any combination of the DAG operations as determined by the data processor (112). As discussed above, the DAG operations may include discovery operations, bidding counter operations, and metadata mapping operations. The DAG operations performed by the DAG (150) may determine a data node to service a request using discovery metadata, bidding counters, and/or metadata mappings (discussed below) obtained from each data node (e.g., 162A, 162B, 172C, 172D) of data cluster B (110B). The DAG (150) may include other and/or additional functionality without departing from the invention.

In one or more of embodiments of the invention, the DAG (150) is implemented as computer instructions, e.g., computer code, stored on a persistent storage that when executed by a processor of a data node (e.g., 162A, 162B) of the accelerator pool (160) cause the data node to provide the aforementioned functionality of the DAG (150) described throughout this application.

In one or more embodiments of the invention, the DAG (150) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the DAG (150) described throughout this application.

In one or more embodiments of the invention, the DAG (150) is implemented as a logical device. The logical device may utilize the computing resources of any number of computing devices and thereby provide the functionality of the DAG (150) described throughout this application.

Continuing with the discussion of FIG. 1C, different data nodes in data cluster B (110B) may include different quantities and/or types of computing resources, e.g., processors providing processing resources, memory providing memory resources, storages providing storage resources, communicators providing communications resources. Thus, the system may include a heterogeneous population of nodes.

The heterogeneous population of nodes may be logically divided into an accelerator pool (160) including nodes that have more computing resources, e.g., high performance nodes (162A, 162B) than other nodes and a non-accelerator pool (170) including nodes that have fewer computing resources, e.g., low performance nodes (172C, 172D) than the nodes in the accelerator pool (160). For example, nodes of the accelerator pool (160) may include enterprise class solid state storage resources that provide very high storage bandwidth, low latency, and high input-outputs per second (IOPS). In contrast, the nodes of the non-accelerator pool (170) may include hard disk drives that provide lower storage performance. Node bidding counters associated with data nodes of the accelerator pool (160) may, generally, be higher and include more emphasis towards them than node bidding counters associated with data nodes of the non-accelerator pool (170) due to the improved performance of data nodes in the accelerator pool (160). While illustrated in FIG. 1C as being divided into two groups, the nodes may be divided into any number of groupings based on the relative performance level of each node without departing from the invention.

In one or more embodiments of the invention, the data nodes (e.g., 162A, 162B, 172C, 172D) may be an embodiment of the data nodes (140A, 140B, 140N, FIG. 1B) discussed above. For additional information regarding the data nodes (e.g., 162A, 162B, 172C, 172D), refer to e.g., FIG. 1B.

Figure 1D:
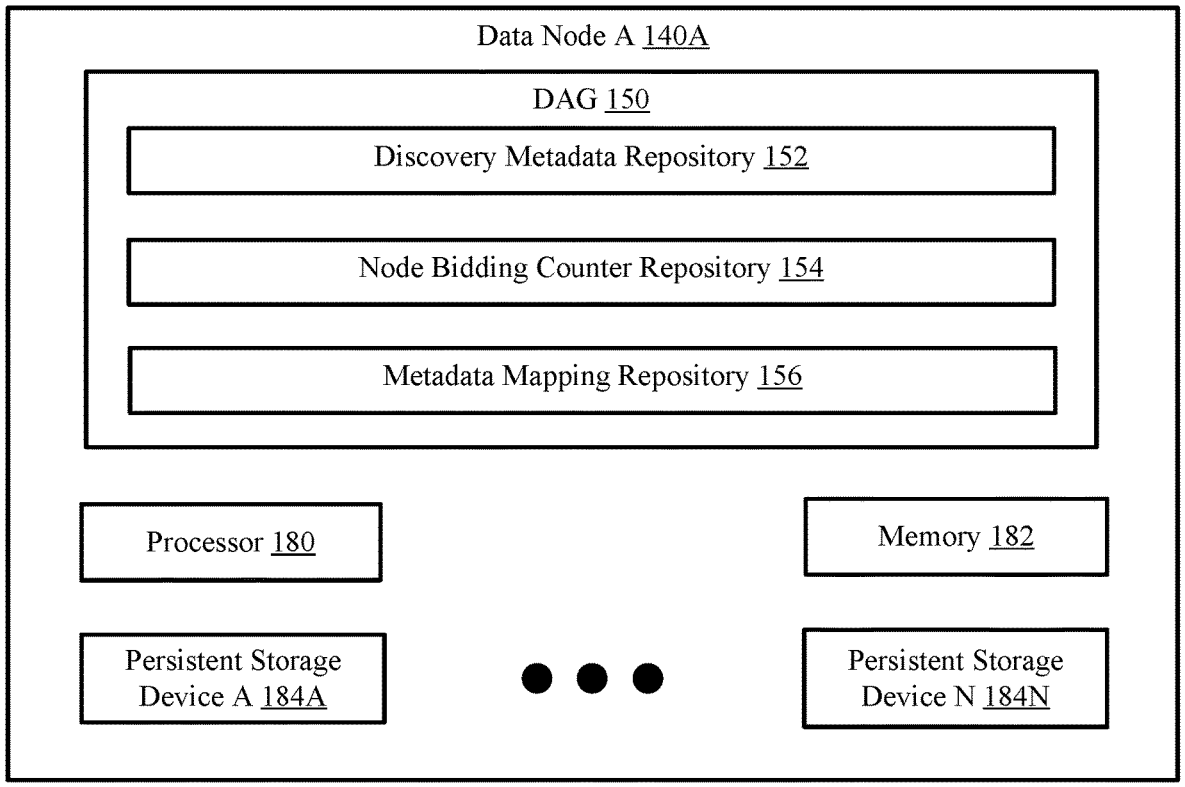
FIG. 1D shows a diagram of a data node with a data access gateway in accordance with one or more embodiments of the invention.

FIG. 1D shows a diagram of a data node with a data access gateway (DAG) in accordance with one or more embodiments of the invention. The data node (140A) may be an embodiment of the data nodes (e.g., 140A, 140B, 140N, FIG. 1B; 162A, 162B, 172C, 172D, FIG. 1C) discussed above. The data node (140A) may include a DAG (150) as determined, e.g., by a data processor (e.g., 112, FIG. 1B). The data node (140A) may also include a processor (180), memory (182), and one or more persistent storage devices (184A, 184N). The components of the data node may be operably connected via any combination of wired and/or wireless connections. Each of the aforementioned components is discussed below.

In one or more embodiments of the invention, the DAG (150) is a device (physical or logical) that includes functionality to determine a data node (e.g., 162A, 162B, 172C, 172D, FIG. 1C) of the data cluster (110B, FIG. 1C) to service a request from a host (e.g., 100, FIG. 1A). The DAG (150) may be an embodiment of the DAGs (150, FIG. 1B; 150, FIG. 1C) discussed above. The DAG (150) may select data nodes to service requests from hosts via DAG operations. The DAG operations may include discovery operations, bidding counter operations, and/or metadata mapping operations. To perform the aforementioned operations, the DAG (150) may use data structures stored in a discovery metadata repository (152), node bidding counter repository (154), and/or a metadata mapping repository (156). Each of these components is discussed below.

In one or more embodiments of the invention, the discovery metadata repository (142) includes one or more data structures that include discovery metadata. The discovery metadata may include one or more lists of data node identifiers associated with the data nodes (e.g., 140A, 140B, 140N, FIG. 1B) of the data cluster (e.g., 110A) that are available to service requests obtained from the host (e.g., 100, FIG. 1A). The data node identifiers may be used by the DAG (150) to differentiate a particular data node of the data cluster. A data node identifier may be a unique global bit string or character string that is associated with a data node of the data cluster.

The discovery metadata repository (152) may also include retry counts and retry limits (not shown) associated with each data node (e.g., 140A, 140B, 140N, FIG. 1B). The retry counts may be numbers. a retry count may specify the amount of the times a request has been retried on a data node (e.g., 140A, 140B, 140N, FIG. 1B) The DAG (150) may increment retry counts when requests are retried on data nodes (e.g., 140A, 140B, 140N, FIG. 1B). The DAG (150) may reset retry counts when a request is serviced by a data node (e.g., 140A, 140B, 140N, FIG. 1B) and/or a new request is obtained. The retry limits may be numbers. A retry limit may specify the maximum allowable times a request may be retried for a data node (e.g., 140A, 140B, 140N, FIG. 1B).

The DAG (150) may update the discovery metadata repository (152) based on newly obtained discovery metadata from the data nodes (e.g., 140A, 140B, 140N, FIG. 1B). The DAG (150) may use the discovery metadata of the discovery metadata repository (152) to determine which data nodes (e.g., 140A, 140B, 140N, FIG. 1B) of data cluster A (e.g., 110A, FIG. 1B) are available to service requests obtained from the host (100, FIG. 1A). The discovery metadata repository (152) may include other and/or additional information and may be used for other and/or additional purposes without departing from the invention.

In one or more embodiments of the invention, the node bidding counter repository (154) may include one or more data structures that include node bidding counters. The node bidding counters may be numerical representations of the computational, network, and/or storage resources available to data nodes (e.g., 140A, 140B, 140N, FIG. 1B) of a data cluster (e.g., 110A, FIG. 1B). Each of the node bidding counters may be associated with a data node (e.g., 140A, 140B, 140N, FIG. 1B). A data node (e.g., 140A) associated with a high node bidding counter may have a large amount of computational, network, and storage resources available and may be better suited to service a request obtained from a host (e.g., 100, FIG. 1A) comparted to a data node (e.g., 140B, FIG. 1B) with a low bidding counter. Each of the node bidding counters may be associated with a point in time. The DAG (150) may use the node bidding counters to determine which data nodes (e.g., 140A, 140B, 140N, FIG. 1B) have the most available computing, network, and/or storage resources to service requests obtained from the host (100, FIG. 1A) based on the node bidding counters of the node bidding counter repository (154). The node bidding counter repository (154) may include other and/or additional information and may be used for other and/or additional purposes without departing from the invention.

In one or more embodiments of the invention, the metadata mapping repository (156) may include one or more data structures that include metadata mappings. The metadata mappings may include metadata associated with the data stored in each of the data nodes (e.g., 140A, 140B, 140N, FIG. 1B) of a data cluster (e.g., 110A, FIG. 1B). Each of the metadata mappings may be associated with a data node (e.g., 140A, 140B, 140N, FIG. 1B). Each of the metadata mappings may be updated by the DAG (150) based on newly obtained metadata mappings. The DAG (150) may use the metadata mappings to determine data nodes (e.g., 140A, 140B, 140N, FIG. 1B) that include the data necessary to service requests obtained from the host (100, FIG. 1A). The metadata mapping repository (156) may include other and/or additional information and may be used for other and/or additional purposes without departing from the invention.

While the data structures (e.g., 152, 154, 156) of the DAG (150) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in storage of the DAG (150), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

In one or more embodiments of the invention, the processor (180) is a component that processes data and services requests. The processor (180) may be, for example, a central processing unit (CPU). The processor (180) may be other types of processors without departing from the invention. The processor (180) may service a request to store data and/or metadata and rebuild data and/or metadata using data stored in memory (182), the persistent storage devices (184A, 184N), and/or other data nodes (e.g., 140B, 140N, FIG. 1B). The processor (180) may service other requests without departing from the invention.

In one or more embodiments of the invention, the data node (140A) includes memory (182), which stores data that is more accessible to the processor (180) than the persistent storage devices (184A, 184N). The memory (182) may be volatile storage. Volatile storage may be storage that stores data that is lost when the storage loses power. The memory (182) may be, for example, Random Access Memory (RAM). In one or more embodiments of the invention, a copy of the data and/or parity chunks required to service a request are stored in the memory (182) of the data node (140A).

In one or more embodiments of the invention, the persistent storage devices (184A, 184N) store data and rebuild data. The data may be data chunks and/or parity chunks. The persistent storage devices (184A, 184N) may include non-volatile storage (also referred to as persistent storage). In other words, the data stored in the persistent storage devices (184A, 184N) is not lost or removed when the persistent storage devices (184A, 184N) lose power. For additional details regarding the persistent storage devices (184A, 184N) see, e.g., FIG. 1F.

Figure 1E:
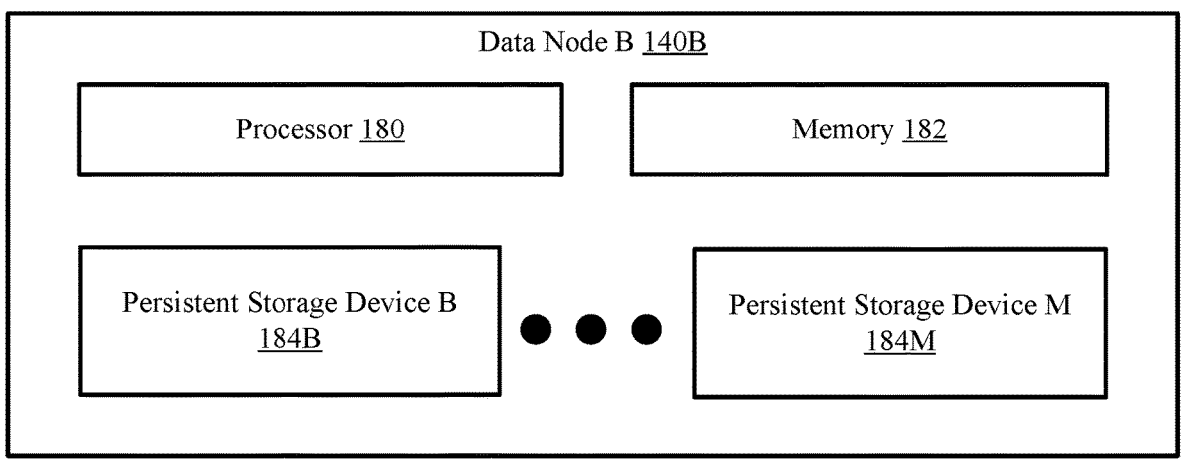
FIG. 1E shows a diagram of a data node without a data access gateway in accordance with one or more embodiments of the invention.

FIG. 1E shows a diagram of a data node without a data access gateway (DAG) in accordance with one or more embodiments of the invention. Data node B (140B) may be an embodiment of the data nodes (e.g., 140A, 140B, 140N, FIG. 1B; 162A, 162B, 172C, 172D, FIG. 1C) discussed above. Data node B (140B) may not include a DAG (150) as determined, e.g., by a data processor (e.g., 112, FIG. 1B). Data node B (140B) may also include a processor (180), memory (182), and one or more persistent storage devices (184B, 184M). The components of the data node may be operably connected via any combination of wired and/or wireless connections. Each of the aforementioned components is discussed below.

The processor (180) may be an embodiment of the processor (180, FIG. 1D) discussed above. For additional information regarding the processor, refer to e.g., FIG. 1D.

The processor (180) may be an embodiment of the processor (180, FIG. 1D) discussed above. For additional information regarding the processor (180), refer to e.g., FIG. 1D.

The memory (182) may be an embodiment of the memory (182, FIG. 1D) discussed above. For additional information regarding the memory (182), refer to e.g., FIG. 1D.

The persistent storage devices (184B, 184M) may be an embodiment of the persistent storage devices (184A, 184N, FIG. 1D) discussed above. For additional information regarding the persistent storage devices (184B, 184M), refer to e.g., FIG. 1D.

Figure 1F:
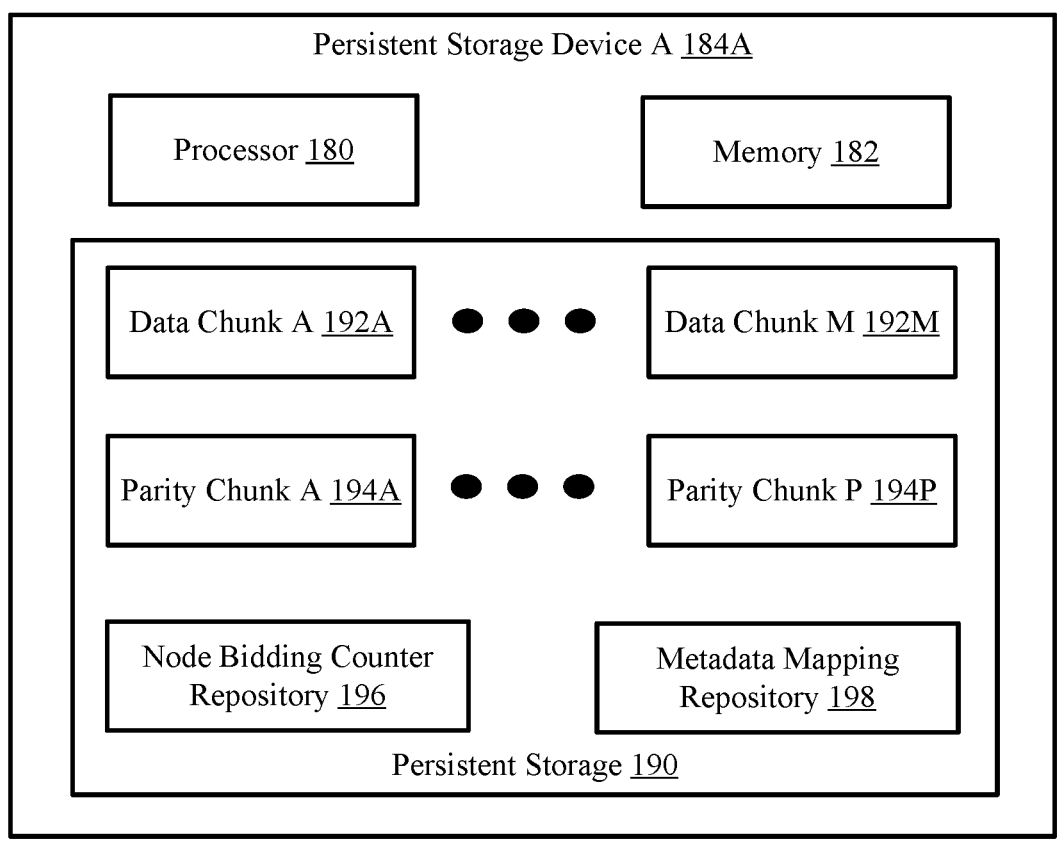
FIG. 1F shows a diagram of a persistent storage device in accordance with one or more embodiments of the invention.

FIG. 1F shows a diagram of a persistent storage device (184A) in accordance with one or more embodiments of the invention. The persistent storage device (184A) may be an embodiment of a persistent storage device discussed above (e.g., 184A, 184N, 184B, 184M) discussed above. As discussed above, the persistent storage device (184A) stores and rebuilds data. The data may be data chunks (192A, 192M) and parity chunks (194A, 194P). The data may also include a node bidding counter repository (196) and a metadata mapping repository (198). The persistent storage device (184A) may include a processor (180), memory (182), and persistent storage (190). Each of these components is discussed below.

The processor (180) may be an embodiment of the processor (180, FIG. 1D) discussed above. For additional information regarding the processor (180), refer to e.g., FIG. 1D.

The memory (182) may be an embodiment of the memory (182, FIG. 1D) discussed above. For additional information regarding the memory (182), refer to e.g., FIG. 1D.

As discussed above, the persistent storage (190) may store data. The data stored in persistent storage (190) may include data chunks (192A, 192M) and parity chunks (194A, 194P). The persistent storage (190) may also store a bidding counter repository (196) and a metadata mapping repository (198). Each of these data structures is discussed below. The persistent storage (190) may store other and/or additional data without departing from the invention.

The persistent storage (190) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (190) may utilize portions of any combination of hard disk drives, solid state disk drives, tape drives, and/or any other physical storage medium of any number of computing devices.

In one or more embodiments of the invention, a data chunk (192A, 192M) is a data structure that includes a portion of data that was obtained from a host. The data chunks (192A, 192M) may be (but are not required to be) deduplicated by a data processor and obtained by the persistent storage device (184A) from the data processor. Each of the data chunks (192A, 192M) may be used by the persistent storage device (184A) (or another persistent storage device) to reconstruct another data chunk or a parity chunk based on an erasure coding algorithm that was applied to the other data chunk or parity chunk.

In one or more embodiments of the invention, a parity chunk (194A, 194P) is a data structure that includes a parity value generated using an erasure coding algorithm. The parity value may be generated by applying the erasure coding algorithm to one or more data chunks stored in the persistent storage device (184A) or other data nodes. Each of the parity chunks (194A, 194P) may be used by the persistent storage device (184A) (or another persistent storage device) to reconstruct another parity chunk or a data chunk based on an erasure coding algorithm that was applied to the other parity chunk or data chunk.

In one or more embodiments of the invention, the node bidding counter repository (196) may include one or more data structures that include bidding counters associated with the data node (e.g., 140B, FIG. 1B) that includes the persistent storage device (184A). The node bidding counters may be numerical representations of the computational, network, and/or storage resources available to a data node (e.g., 140A, FIG. 1B) of data cluster A (e.g., 110A, FIG. 1B) that includes the persistent storage device (184A). Each of the node bidding counters may be associated with a point in time. Each of the node bidding counters may include a data node identifier (not shown, discussed above) to which they are associated. A DAG (e.g., 150, FIG. 1B) may use the bidding counters to determine whether the data node (e.g., 140A, FIG. 1B) that includes the persistent storage device (184A) is to service a request from the host (100, FIG. 1A). The node bidding counters of the bidding counter repository (196) may be generated by the data node (e.g., 140A, FIG. 1B) that includes the persistent storage device (184A) and sent to the DAG (e.g., 150, FIG. 1B). The bidding counter repository (196) may include other and/or additional information and may be used for other and/or additional purposes without departing from the invention.

In one or more embodiments of the invention, the metadata mapping repository (198) may include one or more data structures that include metadata mappings associated with the data node (e.g., 140A, FIG. 1B) that includes the persistent storage device (184A). The metadata mappings may include metadata associated with the data stored in each of the data node (e.g., 140A, FIG. 1B) that includes the persistent storage device (184A). The metadata mapping repository (198) may be updated by the data node (e.g., 140A, FIG. 1B) that includes the persistent storage device (184A) or a component therein based on newly obtained metadata mappings associated with the data node (e.g., e.g., 140A, FIG. 1B) that includes the persistent storage device (184A).

The metadata mappings of the metadata mapping repository may be sent to the DAG (e.g., 150, FIG. 1B). The DAG (e.g., 150, FIG. 1B) may use the metadata mappings to determine whether the data node (e.g., e.g., 140A, FIG. 1B) that includes the persistent storage device (184A) includes the data necessary to service requests obtained from the host (100, FIG. 1A). The metadata mapping repository (198) may include other and/or additional information and may be used for other and/or additional purposes without departing from the invention.

Figure 2A:
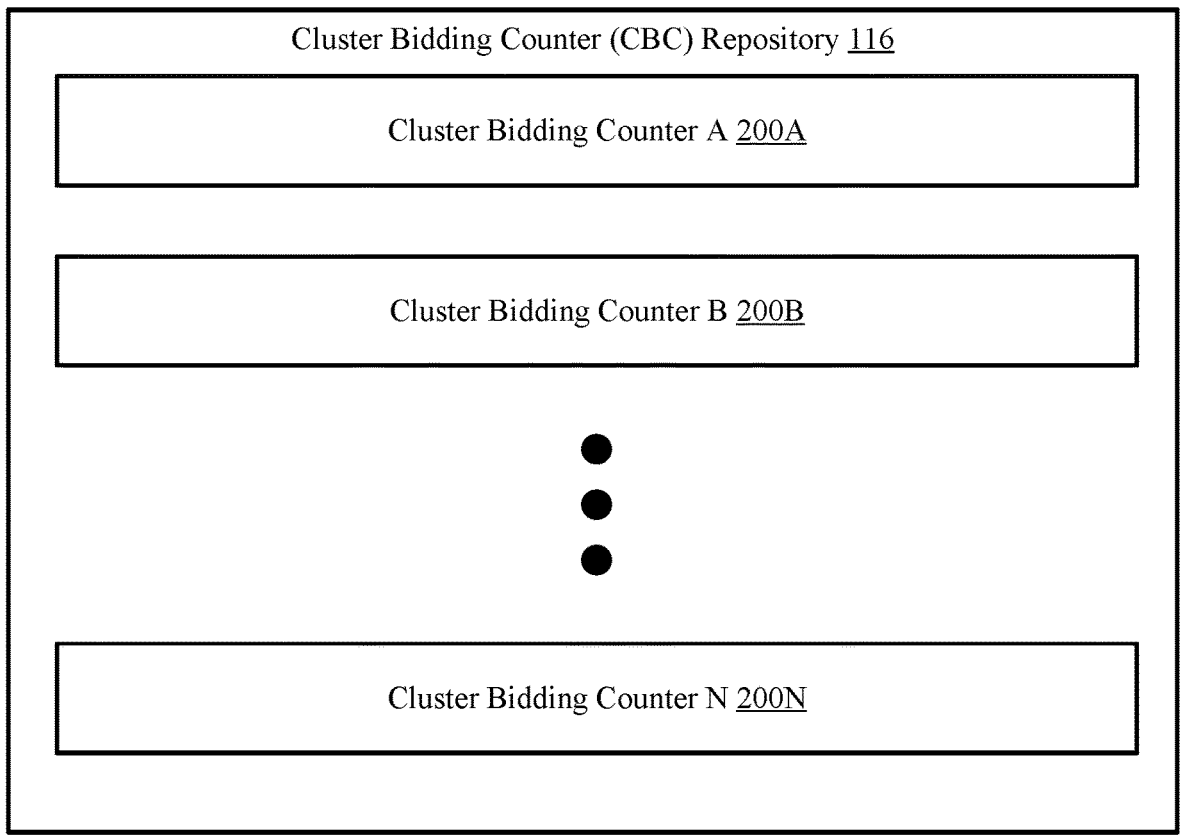
FIG. 2A shows a diagram of a cluster bidding counter repository in accordance with one or more embodiments of the invention.

FIG. 2A shows a diagram of a cluster bidding counter repository in accordance with one or more embodiments of the invention. The cluster bidding counter (CBC) repository (116) may be an embodiment of the of the CBC repository (116, FIG. 1B) discussed above. As discussed above, the CBC repository (116) includes any number of cluster bidding counters (e.g., 200A, 200B, 200N) without departing from the invention. Each of the aforementioned components of the CBC repository (116) is discussed below.

In one or more embodiments of the invention, the cluster bidding counters (e.g., cluster bidding counter A (200A), cluster bidding counter B (200B), and cluster bidding counter N (200N)) are one or more data structures that include numerical representations of the computational, network, and storage resources (discussed below) of the data clusters that are available at a point in time. In one embodiment of the invention, a cluster bidding counter (e.g., 200A) may include a single numerical value (not shown) that represents as a whole the computational, network, and storage resources of a data cluster (e.g., 110A, FIG. 1A) that are available at a point in time. In another embodiment of the invention, a bidding counter (e.g., 200A) may include three numerical values (not shown), each of which represents the computational, network, and storage resources of a data cluster (e.g., 110A, FIG. 1A) respectively that are available at a point in time.

A cluster bidding counter (e.g., 200A) that includes a higher numerical value may be associated with a data cluster (e.g., 110A, FIG. 1A) that includes a higher availability of resources at the point in time associated with the cluster bidding counter (e.g., 200A). The cluster bidding counters (e.g., 200A, 200B, 200N) may also include timestamps (not shown) that denote the point in time in which the cluster bidding counters (e.g., 200A, 200B, 200N) were generated. Each of the cluster bidding counters (e.g., 200A, 200B, 200N) may be associated with a point in time. Each of the cluster bidding counters (e.g., 200A, 200B, 200N) may include a data cluster identifier (not shown, discussed below) to which they are associated. The cluster bidding counters (e.g., 200A, 200B, 200N) may be generated by data clusters (e.g., 110A, 110B, 110N, FIG. 1A), or components thereof, to which they are associated and may be used by the data processor (e.g., 112, FIG. 1B) to determine which data cluster (e.g., 110A, FIG. 1A) services a request obtained from the host (100, FIG. 1A). The cluster bidding counters (e.g., 200A, 200B, 200N) may include other and or additional information and may be used for other and/or additional purposes without departing from the invention.

The computational resources of a data cluster (e.g., 110A, FIG. 1A) may refer to the amount, or type of processors and memory available to the data cluster (e.g., 110A, FIG. 1A) to perform calculations and service requests. The computational resources of a data cluster (e.g., 110A, FIG. 1A) may refer to other and/or additional information associated with the computational capabilities of the data cluster (e.g., 110A, FIG. 1A) without departing from the invention.

The network resources of a data cluster (e.g., 110A, FIG. 1A) may refer to the amount or type of network cards, and/or total network bandwidth available to the data cluster (e.g., 110A, FIG. 1A) to perform calculations and service requests. The network resources of a data cluster (e.g., 110A, FIG. 1A) may refer to other and/or additional information associated with the network capabilities of the data cluster (e.g., 110A, FIG. 1A) without departing from the invention.

The storage resources of a data cluster (e.g., 110A, FIG. 1A) may refer to the amount, or type, of persistent storage and total storage capacity available to the data cluster (e.g., 110A, FIG. 1A) to perform calculations and service requests. The storage resources of a data cluster (e.g., 110A, FIG. 1A) may refer to other and/or additional information associated with the storage capabilities of the data cluster (e.g., 110A, FIG. 1A) without departing from the invention.

While the data structures (e.g., cluster bidding counter A (200A), cluster bidding counter B (200B), cluster bidding counter N (200N)) of the CBC repository (116) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures without departing from the invention.

Figure 2B:
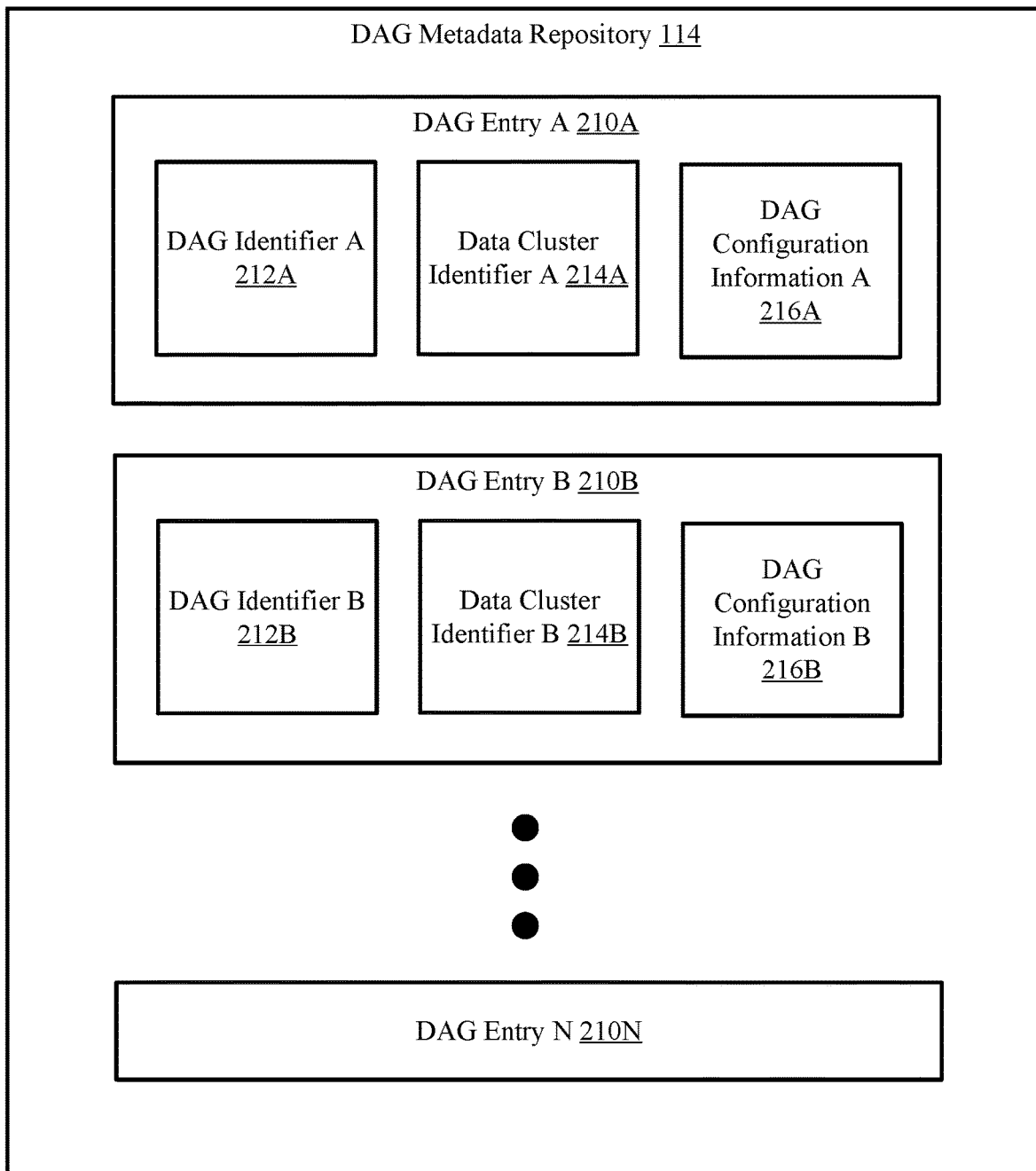
FIG. 2B shows a diagram of a data access gateway (DAG) metadata repository in accordance with one or more embodiments of the invention.

FIG. 2B shows a diagram of a data access gateway (DAG) metadata repository in accordance with one or more embodiments of the invention. The DAG metadata repository (114) may be an embodiment of the of the DAG metadata repository (114, FIG. 1B) discussed above. As discussed above, the DAG metadata repository (114) includes any number of DAG entries (e.g., DAG entry A (210A), DAG entry B (210B), DAG entry N (210N)) without departing from the invention. The DAG metadata repository may be used by the data processor (112) to determine which data clusters (110, FIG. 1A) to use to service requests. Each of the aforementioned components of the DAG metadata repository (114) is discussed below.

In one or more embodiments of the invention, the DAG entries (e.g., 210A, 210B, 210N) are one or more data structures that include information regarding the DAGs (e.g., 150, FIG. 1B) of the data clusters of the system illustrated in FIG. 1A. Each DAG entry (e.g., 210A, 210B, 210N) may be associated with a data cluster (e.g., 110A, 110B, 110N). The DAG entries (210A, 210B, 210N) may be generated by the data processor (e.g., 112, FIG. 1B) when a DAG (e.g., 150, FIG. 1B) operating on a data cluster (e.g., 110A) registers with the data processor (e.g., 112, FIG. 1B). There may be any number of DAG entries (e.g., 210A, 210B, 210N) in the DAG metadata repository (114) without departing from the invention. Each DAG entry may include information regarding a DAG (e.g., 150, FIG. 1B) operating on a data cluster (e.g., 110A, FIG. 1A). The DAG entries (e.g., 210A, 210B, 210N) may include DAG identifiers (e.g., DAG identifier A (212A), DAG identifier B (212B)), data cluster identifiers (e.g., data cluster identifier A (214A), data cluster identifier B (214B)), and DAG configuration information (e.g., DAG configuration information A (216A), DAG configuration information B (216B)). The DAG entries (e.g., 210A, 210B, 210N) may include other and/or additional information regarding DAGs (e.g., 150, FIG. 1B) operating on the data clusters (110, FIG. 1A) without departing from the invention. Each of the components of the DAG entries (e.g., 210A, 210B, 210N) is discussed below.

The DAG identifiers (e.g., 212A, 212B) may be identifiers associated with DAGs (e.g., 150, FIG. 1B) operating on data cluster (e.g., 110, FIG. 1A). A DAG identifier (e.g., 212A, 212B) may be a unique, global string of bits that is associated with a DAG (e.g., 150, FIG. 1B). The DAG identifiers (212A, 212B) may be used by the data processor (e.g., 112, FIG. 1B) to differentiate between the DAGs (e.g., 150, FIG. 1B) operating on the data clusters (110, FIG. 1B). The DAG identifiers (212A, 212B) may be generated and assigned by the data processor (e.g., 112, FIG. 1B) when a DAG (e.g., 150, FIG. 1B) registers with the data processor (e.g., 112, FIG. 1B). The DAG identifiers (212A, 212B) may include other and/or additional information regarding the DAGs (e.g., 150, FIG. 1B) operating on the data clusters (110, FIG. 1A) without departing from the invention.

The data cluster identifiers (e.g., 214A, 214B) may be identifiers associated with data clusters (e.g., 110, FIG. 1A) that include DAGs (e.g., 150, FIG. 1B). A data cluster identifier (e.g., 214A, 214B) may be a unique, global string of bits that is associated with a data cluster (e.g., 110A, FIG. 1A). The data cluster identifiers (214A, 214B) may be used by the data processor (e.g., 112, FIG. 1B) to determine the data clusters (e.g., 110A, FIG. 1A) that include the DAGs (e.g., 150, FIG. 1B) associated with the asset entry (e.g., 210A, 210B, 210N). The data cluster identifiers (214A, 214B) may be generated by the data processor (e.g., 112, FIG. 1B) or by the DAG (e.g., 150, FIG. 1B) and may be assigned by the data processor (e.g., 112, FIG. 1B) when a DAG (e.g., 150, FIG. 1B) registers with the data processor (e.g., 112, FIG. 1B). The data cluster identifiers (214A, 214B) may include other and/or additional information regarding the data clusters (110, FIG. 1A) associated with DAG entries (e.g., 210A, 210B, 210N) without departing from the invention.

The DAG configuration information (e.g., 216A, 216B) may be information regarding how a DAG (e.g., 150, FIG. 1B) is operating in a data cluster (e.g., 110A, FIG. 1A). The DAG configuration information may include a list of components (i.e., the data nodes (e.g., 140A, 140B, 140N), accelerator pools (160), non-accelerator pools (170), etc.) of the data cluster (e.g., 110A, FIG. 1A). The list of components may also include information that may indicate whether the component includes a DAG (e.g., 150, FIG. 1B), performs DAG operations (discussed above), and whether the component provides metadata mappings and/or data node bidding counters to the DAG(s) and/or other data nodes of the data cluster. The DAG configuration information may be generated by a DAG (e.g., 150, FIG. 1B) when the DAG registers with the data processor (e.g., 112, FIG. 1B). The DAG configuration (e.g., 216A, 216B) information may be used by the data processor (112) to determine whether a data cluster is to be used to service a request. The DAG configuration information (e.g., 216A, 216B) may include other and/or additional information and may be used for other and/or additional purposes without departing from the invention.

While the data structures (e.g., 210A, 210B, 210N, 212A, 214A, 216A, 212B, 214B, 216B) of the DAG metadata repository (114) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures without departing from the invention.

Figure 3A:
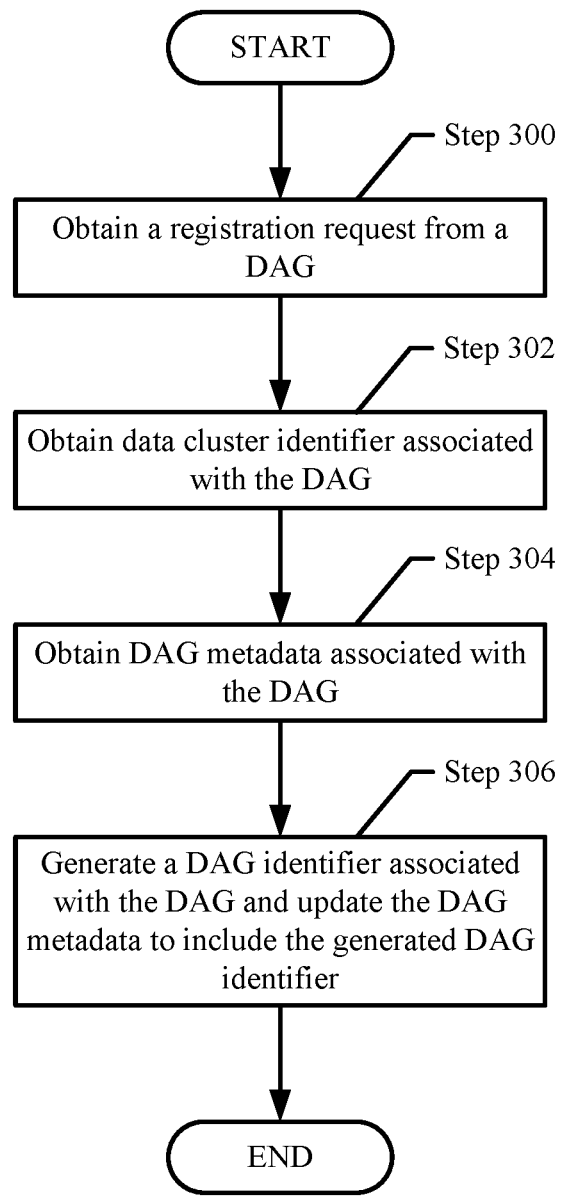
FIG. 3A shows a flowchart of a method for registering a data access gateway (DAG) in accordance with one or more embodiments of the invention.

FIG. 3A shows a flowchart of a method for registering a data access gateway (DAG) in accordance with one or more embodiments of the invention. The method shown in FIG. 3A may be performed by, for example, a data processor (e.g., 112, FIG. 1B). Other components of the data clusters (e.g., 110A, FIG. 1B) may perform all or a portion of the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a registration request is obtained from a DAG. In one or more embodiments of the invention, the DAG sends a message to the data processor. The message may include a request to register the DAG with the data processor. The request may specify the DAG. The request may be obtained from a DAG via other and/or additional methods without departing from the invention.

In step 302, a data cluster identifier associated with the DAG is obtained. In one or more embodiments of the invention, the data processor sends a message to the DAG. The message may include a request for a data cluster identifier associated with the DAG. In response to obtaining the message, the DAG may generate or obtain a data cluster identifier associated with the data cluster on which the DAG is operating. The DAG may send a message to the data processor that includes the data cluster identifier. A data cluster identifier may be obtained via other and/or additional methods without departing from the invention.

In step 304, DAG metadata associated with the DAG is obtained. In one or more. In one or more embodiments of the invention, the data processor sends a message to the DAG. The message may include a request for DAG metadata associated with the DAG. In response to obtaining the message, the DAG may generate and/or obtain the DAG metadata. The DAG metadata may include DAG configuration information associated with the DAG. The DAG may send a message to the data processor that includes the DAG metadata. DAG metadata associated with the DAG may be obtained via other and/or additional methods without departing from the invention.

In step 306, a DAG identifier associated with the DAG is generated and the DAG metadata is updated to include the generated DAG identifier. In one or more embodiments of the invention, the data processor generates the DAG identifier associated with the DAG. The data processor may then generate a DAG entry in the DAG metadata repository to update the DAG metadata. The data processor may include the DAG identifier, the data cluster identifier, and the DAG metadata (i.e., the DAG configuration information) in the DAG entry associated with the DAG. A DAG identifier associated with the DAG may be generated and the DAG metadata may be updated to include the generated DAG identifier via other and/or additional methods without departing from the invention.

The method may end following step 306.

Figure 3B:
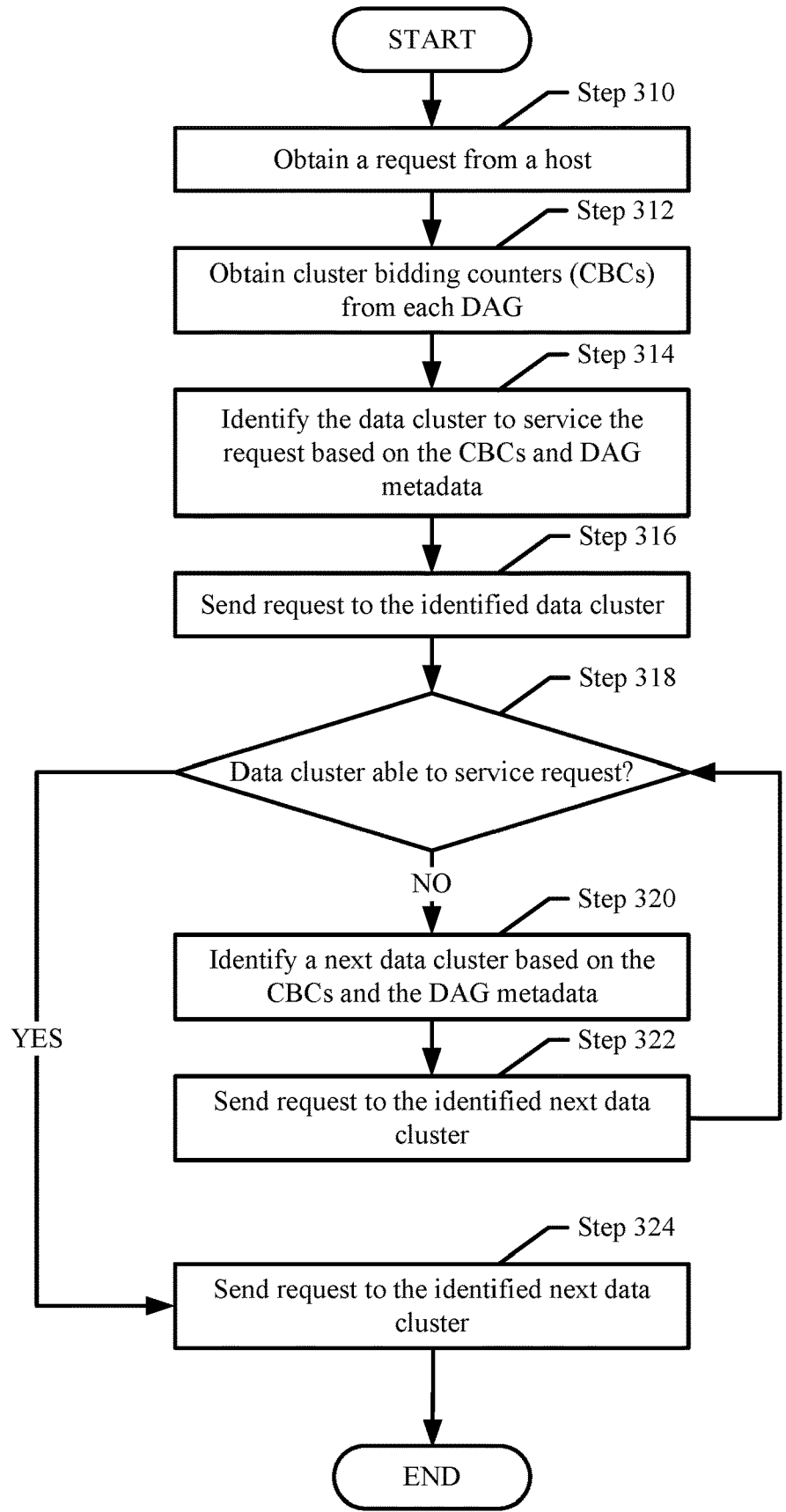
FIG. 3B shows a flowchart of a method for servicing a request in accordance with one or more embodiments of the invention.

FIG. 3B shows a flowchart of a method for servicing a request in accordance with one or more embodiments of the invention. The method shown in FIG. 3B may be performed by, for example, a data processor (e.g., 112, FIG. 1B). Other components of the data clusters (e.g., 110A, FIG. 1B) may perform all or a portion of the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 310, a request is obtained from a host. In one or more embodiments of the invention, the host sends a message to the data processor. The message may include a request that is to be processed the data clusters of the system. The request may include data. The request may be obtained from the host via other and/or additional methods without departing from the invention.

In step 312, cluster bidding counters (CBCs) are obtained from each DAG. In one or more embodiments of the invention, the data processor sends a message to each of the DAGs of the data clusters. The messages may include requests for CBCs from each data cluster. In response to obtaining the request, the DAGs may generate or obtain the CBCs. The CBCs may indicate the computational, network, and storage resources available to the associated data clusters at the time the CBCs were generated as discussed above. The DAGs may send messages to the data processor that include the CBCs. CBCs may be obtained from each DAG via other and/or additional methods without departing from the invention.

In step 314, the data cluster to service the request is identified based on the CBCs and DAG metadata. As discussed above, the CBCS may be numerical representations of the computational, network, and storage resources available for data clusters. The data processor may compare the obtained bidding counter with each other to obtain an ordered list of data clusters based on the CBCs of the data clusters. The CBC with the highest numerical representation may be identified as the highest CBC. The data processor may also obtain the DAG entry associated with each DAG of each data cluster included in the list of ordered data clusters. The data processor may check the DAG configuration information to determine whether the data cluster can service the request. The data processor may select the data cluster associated with the highest CBC that is also associated with DAG configuration information that indicate that the data cluster can service the request. The data cluster to service the request may be identified based on the CBCs and the DAG metadata via other and/or additional methods without departing from the invention.

In step 316, the request is sent to the identified data cluster. In one or more embodiments of the invention, the data processor sends a message to the DAG of the identified data cluster. The message may include the request obtained from the host. The request may be a copy of the request obtained from the host. The data processor may copy the request in the event that the identified data cluster is unable to perform the request and the data processor is required to send the request to another data cluster. The request may be sent to the identified data cluster via other and/or additional methods without departing from the invention.

In step 318, a determination is made as to whether or not the data cluster is able to service the request. In one or more embodiments of the invention, the DAG of the data cluster sends confirmation when a request is processed. The data processor may wait a predetermined amount of time to obtain the confirmation from the DAG of the data cluster. If the data processor waits the predetermined amount of time and does not receive confirmation from the data node, the data processor may determine that the data cluster is unable to service the request. If the data processor obtains confirmation prior to the predetermined amount of time elapses, the data processor may determine that the data cluster is able to service the request. It may be determined whether the data cluster is able to service the request via other and/or additional methods without departing from the invention.

In another embodiment of the invention, the identified data cluster may be unavailable. The identified data cluster may have become unavailable in the time between generating CBCs and obtaining the request. The identified data cluster may have become unavailable due to network connection loss, power loss, and/or another or additional reasons without departing from the invention. If the identified data cluster is unavailable, then the data processor may determine that the data cluster is not able to service the request. If the data cluster is available, the data processor may wait for confirmation from the DAG of the data cluster to determine if the data cluster is able to service the request as described above. In the event that all data clusters are unavailable or are not able to service the request, the data processor may retry the data clusters until the request is serviced or a predetermined period of time has passed since the first data cluster attempted to service the request. In scenarios in which no data cluster is able to service the request and a predetermined period of time has passed, the data processor may send a notification to the host that indicates that no data cluster was able to service the request.

If it is determined that the data cluster is able to service the request, then the method may proceed to step 324. If it is determined that the data cluster is not able to service the request, then the method may proceed to step 320.

In step 320, a next data cluster is identified based on the CBCs and the DAG metadata. In one or more embodiments of the invention, the data processor then compares all of the CBCs that are lower than the CBC associated with the previous data cluster to identify the next highest CBC. The data processor may also use the DAG entries associated with the data clusters to determine whether the data cluster with the next highest CBC is able to service the request. The data processor may identify the data cluster associated with the next highest CBC that can service the request based on the DAG metadata as the next data cluster to attempt to service the request. The next data cluster may be identified based on the CBCs and the DAG metadata via other and/or additional methods without departing from the invention.

For requests involving storing data, the data processor may initiate the migration of data stored in subsequent data clusters to the primary data clusters. The primary data clusters may be data clusters specified by the request obtained from the host and/or the first tried data cluster associated with the highest CBC. The data processor may send a migration request to the DAG of the subsequent data cluster which services the request to migrate the data associated with the request to the primary storage when the primary storage becomes available. The request may include the data cluster identifier associated with the primary data cluster. The data processor may send a notification to the DAG of the subsequent data cluster when the primary data cluster becomes available. The DAG of the subsequent data cluster may use metadata mappings maintained by the DAG or obtained from another DAG to obtain the data associated with the request and send the data to the primary data cluster where it is stored after obtaining both the migration request and the notification. Data may be migrated via other and/or additional methods without departing from the invention.

In step 322, the request is sent to the identified next data cluster. In one or more embodiments of the invention, the data processor sends a message to the DAG of the identified next data cluster. The message may include the request obtained from the host. The request may be a copy of the request obtained from the host. The data processor may copy the request in the event that the identified next data cluster is unable to perform the request and the data processor is required to send the request to another data cluster. The request may be sent to the identified next data cluster via other and/or additional methods without departing from the invention. The method may proceed to step 318 following step 322.

In step 324, a notification is sent to the host. In one or more embodiments of the invention, the data processor sends a message to the host. The message may include a notification. The notification may indicate that the request has been successfully serviced in the data cluster. A notification may be sent to the host via other and/or additional methods without departing from the invention.

The method may end following step 324.

Figure 3C:
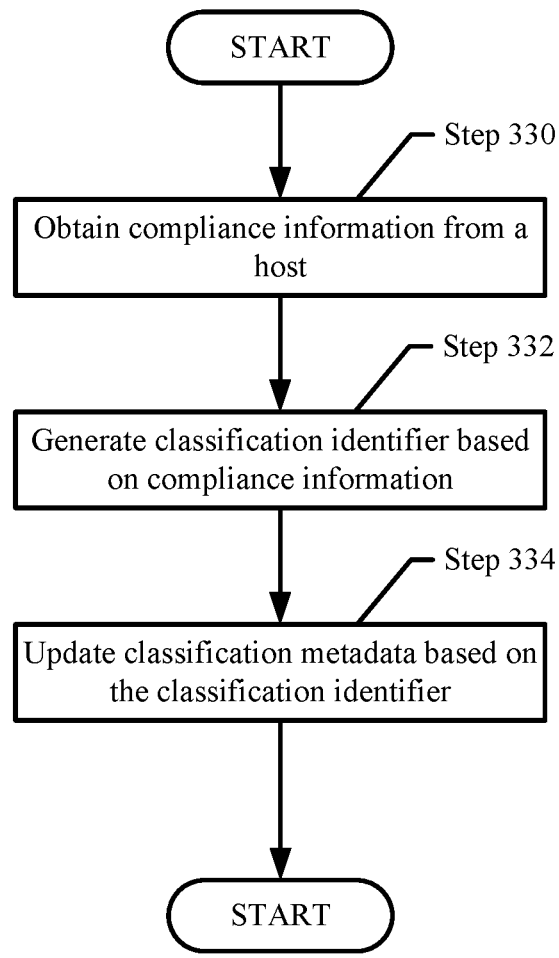
FIG. 3C shows a flowchart of a method for updating classification metadata in accordance with one or more embodiments of the invention.

FIG. 3C shows a flowchart of a method for updating classification metadata in accordance with one or more embodiments of the invention. The method shown in FIG.

3C may be performed by a classification engine (130, FIG. 1B). Other components of the data clusters (e.g., 110A, FIG. 1B) may perform all or a portion of the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 330, compliance information is obtained from a host. In one or more embodiments of the invention, the host sends a message to the classification engine. The message may include compliance information. The compliance information may specify compliance guidelines or requirements for storing replicated data chunks as discussed above. The compliance information may be obtained from the host via other and/or additional methods without departing from the invention.

In step 332, a classification identifier is generated based on the compliance information. In one or more embodiments of the invention, the classification engine generates a classification identifier based on the compliance information. The compliance information may specify that data obtained from the host only be stored in a particular set of data clusters. The classification engine may generate a classification identifier that specifies the particular set of data clusters. The classification identifier may be generated based on the compliance information via other and/or additional methods without departing from the invention.

In step 334, classification metadata is updated based on the classification identifier. In one or more embodiments of the invention, the classification engine stores the classification identifier in the classification metadata. The classification engine may update the classification metadata by associating the classification identifier with data cluster identifiers that are associated with the compliance information used to generate the classification identifier. The classification metadata may be updated based on the classification identifier via other and/or additional methods without departing from the invention.

The method may end following step 334.

Figure 3D:
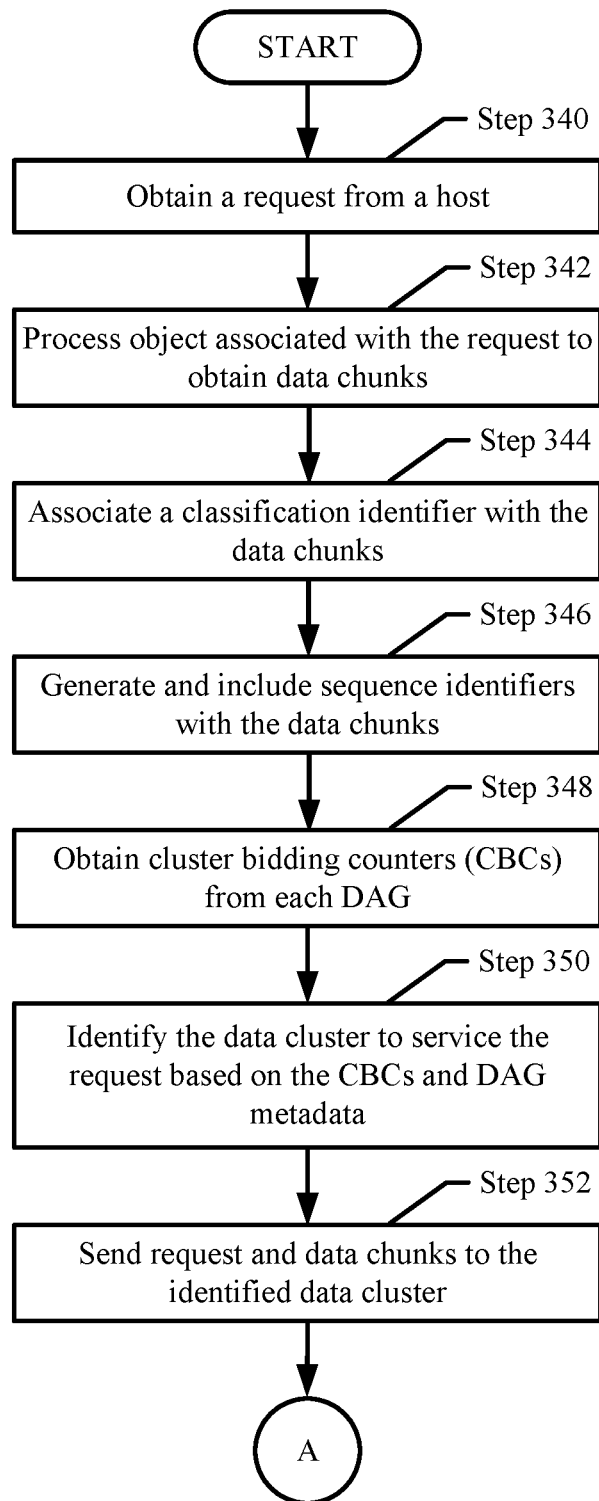
FIGS. 3D-3E show a flowchart of a method for servicing a request with a classification engine in accordance with one or more embodiments of the invention.
Figure 3E:
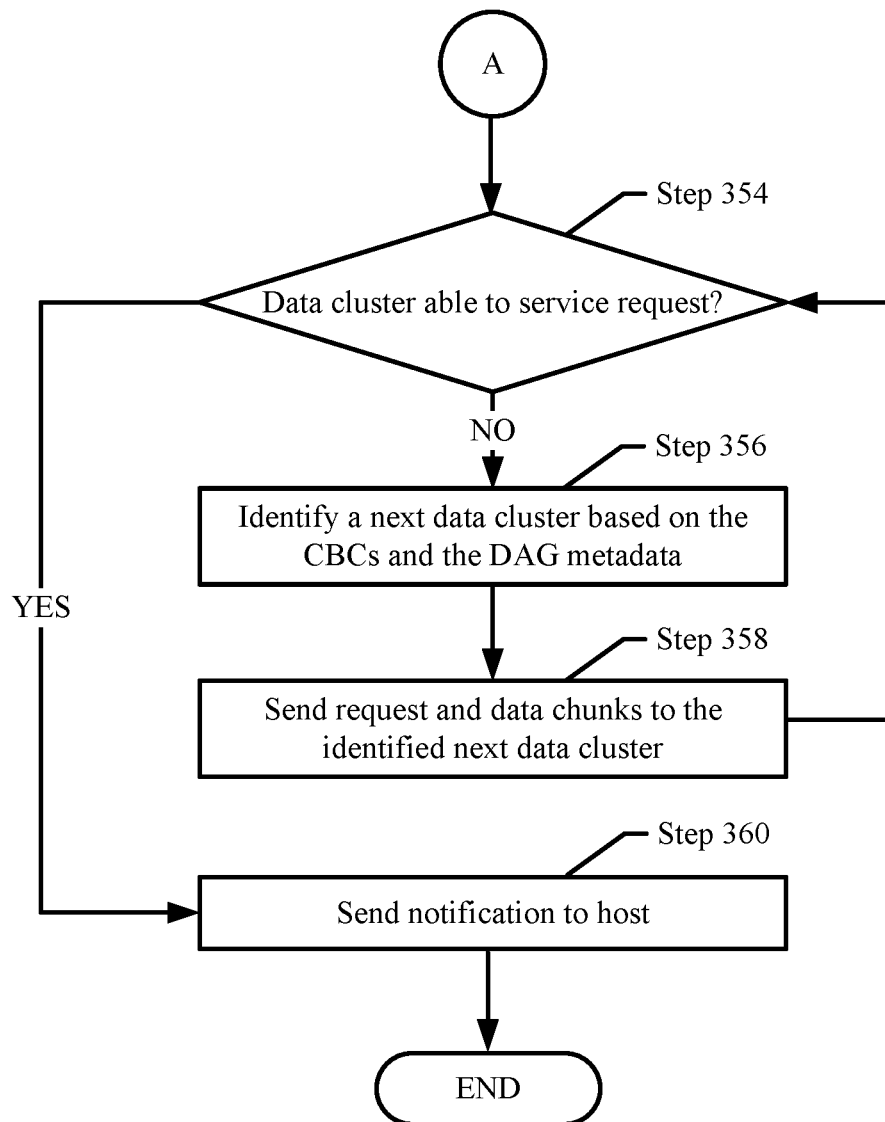

FIGS. 3D-3E show a flowchart of a method for servicing a request with a classification engine in accordance with one or more embodiments of the invention. The method shown in FIGS. 3D-3E may be performed by, for example, a data processor (e.g., 112, FIG. 1B). Other components of the data clusters (e.g., 110A, FIG. 1B) may perform all or a portion of the method of FIGS. 3D-3E without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3D, in step 340, a request is obtained from a host. In one or more embodiments of the invention, the host sends a message to the data processor. The message may include a request that is to be processed the data clusters of the system. The request may include data of an object. The request may be obtained from the host via other and/or additional methods without departing from the invention.

In step 342, an object associated with the request is processed to obtain data chunks. In one or more embodiments of the invention the data processor performs erasure coding and/or deduplication on the object to obtain data chunks. Erasure coding results in the generation of data chunks and parity chunks using an erasure coding algorithm as discussed above. Deduplication refers to generating data chunks and/or storing data chunks that are not already stored in storage as discussed above. The data processor may perform erasure coding and/or deduplication on the object to obtain the data chunks. An object associated with the request may be processed to obtain data chunks via other and/or additional methods without departing from the invention.

In step 344, a classification identifier is associated with the data chunks. In one or more embodiments of the invention, the data processor sends a message to the classification engine. The message may include a request for a classification identifier associated with the object. In response to obtaining the request, the classification engine may obtain a classification identifier and send the classification identifier to the data processor. The data processor may associate the classification identifier with the data chunks. The classification identifier may be associated with the data chunks via other and/or additional methods without departing from the invention.

In step 346, sequence identifiers are generated and included with the data chunks. In one or more embodiments of the invention, the data processor generates sequencing metadata that includes sequence identifiers. The sequence identifiers may specify a specific order of the data chunks as discussed above. The data processor may generate a first sequence identifier associated with the first data chunk, a second sequence identifier associated with the second data chunk and so on until each data chunk is associated with a sequence identifier. The data processor may include the sequence identifiers in sequencing metadata and include a copy of each sequence identifier in the data chunk to which they are associated. The sequencing metadata may also be updated to associated the generated sequencing identifiers with an object identifier. Sequence identifiers may be generated and included with the data chunks via other and/or additional methods without departing from the invention.

In step 348, cluster bidding counters (CBCs) are obtained from each DAG. In one or more embodiments of the invention, the data processor sends a message to each of the DAGs of the data clusters. The messages may include requests for CBCs from each data cluster. In response to obtaining the request, the DAGs may generate or obtain the CBCs. The CBCs may indicate the computational, network, and storage resources available to the associated data clusters at the time the CBCs were generated as discussed above. The DAGs may send messages to the data processor that include the CBCs. CBCs may be obtained from each DAG via other and/or additional methods without departing from the invention.

In step 350, a data cluster to service the request is identified based on the CBCs and DAG metadata. As discussed above, the CBCs may be numerical representations of the computational, network, and storage resources available for data clusters. The data processor may compare the obtained bidding counter with each other to obtain an ordered list of data clusters based on the CBCs of the data clusters. The CBC with the highest numerical representation may be identified as the highest CBC. The data processor may also obtain the DAG entry associated with each DAG of each data cluster included in the list of ordered data clusters. The data processor may check the DAG configuration information to determine whether the data cluster can service the request. The data processor may select the data cluster associated with the highest CBC that is also associated with DAG configuration information that indicate that the data cluster can service the request.

In one embodiment of the invention, the data processor may also use the classification identifier associated with the data chunks in combination with the CBCs and the DAG metadata to identify the data cluster. The data processor may identify the data cluster (i) with the highest CBC, (ii) includes DAG metadata that indicates the data cluster is able to service the request, and (iii) is specified by the classification identifier. The identified data cluster may be permitted to service the request by the compliance requirements associated with the classification identifier. The data cluster to service the request may be identified based on the CBCs and the DAG metadata via other and/or additional methods without departing from the invention.

In step 352, the request is sent to the identified data cluster. In one or more embodiments of the invention, the data processor sends a message to the DAG of the identified data cluster. The message may include the request obtained from the host. The request may be a copy of the request obtained from the host. The data processor may copy the request in the event that the identified data cluster is unable to perform the request and the data processor is required to send the request to another data cluster. The request may be sent to the identified data cluster via other and/or additional methods without departing from the invention.

Turning to FIG. 3E, in step 354, a determination is made as to whether or not the data cluster is able to service the request. In one or more embodiments of the invention, the DAG of the data cluster sends confirmation when a request is processed. The data processor may wait a predetermined amount of time to obtain the confirmation from the DAG of the data cluster. If the data processor waits the predetermined amount of time and does not receive confirmation from the data node, the data processor may determine that the data cluster is unable to service the request. If the data processor obtains confirmation prior to the predetermined amount of time elapses, the data processor may determine that the data cluster is able to service the request. It may be determined whether the data cluster is able to service the request via other and/or additional methods without departing from the invention.

In another embodiment of the invention, the identified data cluster may be unavailable. The identified data cluster may have become unavailable in the time between generating CBCs and obtaining the request. The identified data cluster may have become unavailable due to network connection loss, power loss, and/or another or additional reasons without departing from the invention. If the identified data cluster is unavailable, then the data processor may determine that the data cluster is not able to service the request. If the data cluster is available, the data processor may wait for confirmation from the DAG of the data cluster to determine if the data cluster is able to service the request as described above. In the event that all data clusters are unavailable or are not able to service the request, the data processor may retry the data clusters until the request is serviced or a predetermined period of time has passed since the first data cluster attempted to service the request. In scenarios in which no data cluster is able to service the request and a predetermined period of time has passed, the data processor may send a notification to the host that indicates that no data cluster was able to service the request.

If it is determined that the data cluster is able to service the request, then the method may proceed to step 360. If it is determined that the data cluster is not able to service the request, then the method may proceed to step 356.

In step 356, a next data cluster is identified based on the CBCs and the DAG metadata. In one or more embodiments of the invention, the data processor then compares all of the CBCs that are lower than the CBC associated with the previous data cluster to identify the next highest CBC. The data processor may also use the DAG entries associated with the data clusters to determine whether the data cluster with the next highest CBC is able to service the request. The data processor may identify the data cluster associated with the next highest CBC that can service the request based on the DAG metadata as the next data cluster to attempt to service the request.

In one embodiment of the invention, the data processor may also use the classification identifier associated with the data chunks in combination with the CBCs and the DAG metadata to identify the next data cluster. The data processor may identify the data cluster (i) with the next highest CBC, (ii) includes DAG metadata that indicates the data cluster is able to service the request, and (iii) is specified by the classification identifier. The identified next data cluster may be permitted to service the request by the compliance requirements associated with the classification identifier. The next data cluster may be identified based on the CBCs and the DAG metadata via other and/or additional methods without departing from the invention.

In step 358, the request is sent to the identified next data cluster. In one or more embodiments of the invention, the data processor sends a message to the DAG of the identified next data cluster. The message may include the request obtained from the host. The request may be a copy of the request obtained from the host. The data processor may copy the request in the event that the identified next data cluster is unable to perform the request and the data processor is required to send the request to another data cluster. The request may be sent to the identified next data cluster via other and/or additional methods without departing from the invention.

In step 360, a notification is sent to the host. In one or more embodiments of the invention, the data processor sends a message to the host. The message may include a notification. The notification may indicate that the request has been successfully serviced in the data cluster. A notification may be sent to the host via other and/or additional methods without departing from the invention.

The method may end following step 360.

Figure 3F:
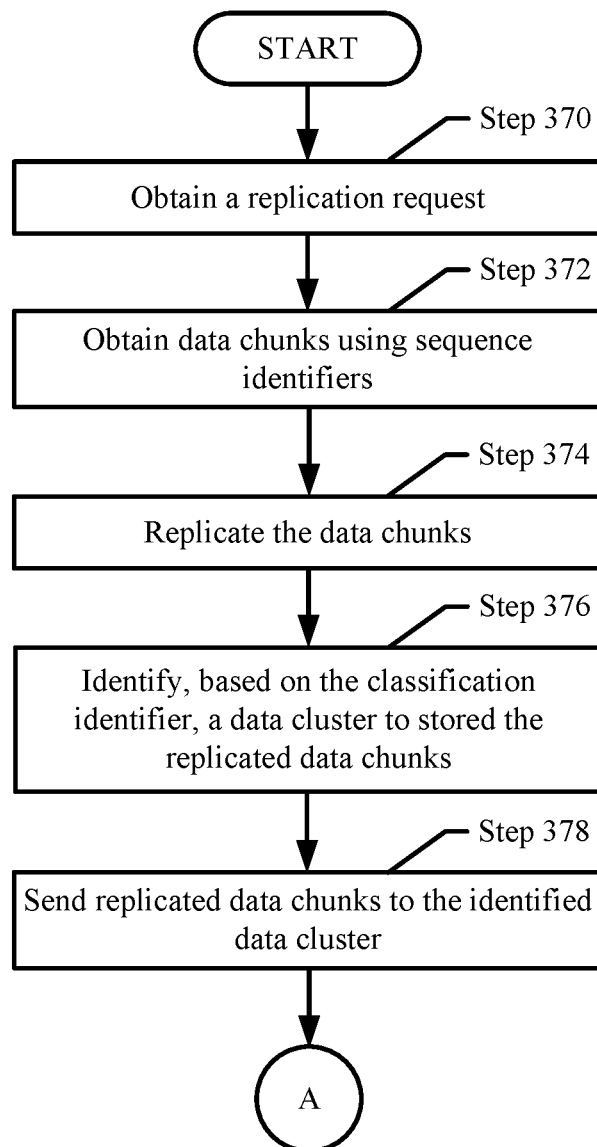
FIGS. 3F-3G show a flowchart of a method for replicating data with a compliance aware replicator in accordance with one or more embodiments of the invention.
Figure 3G:
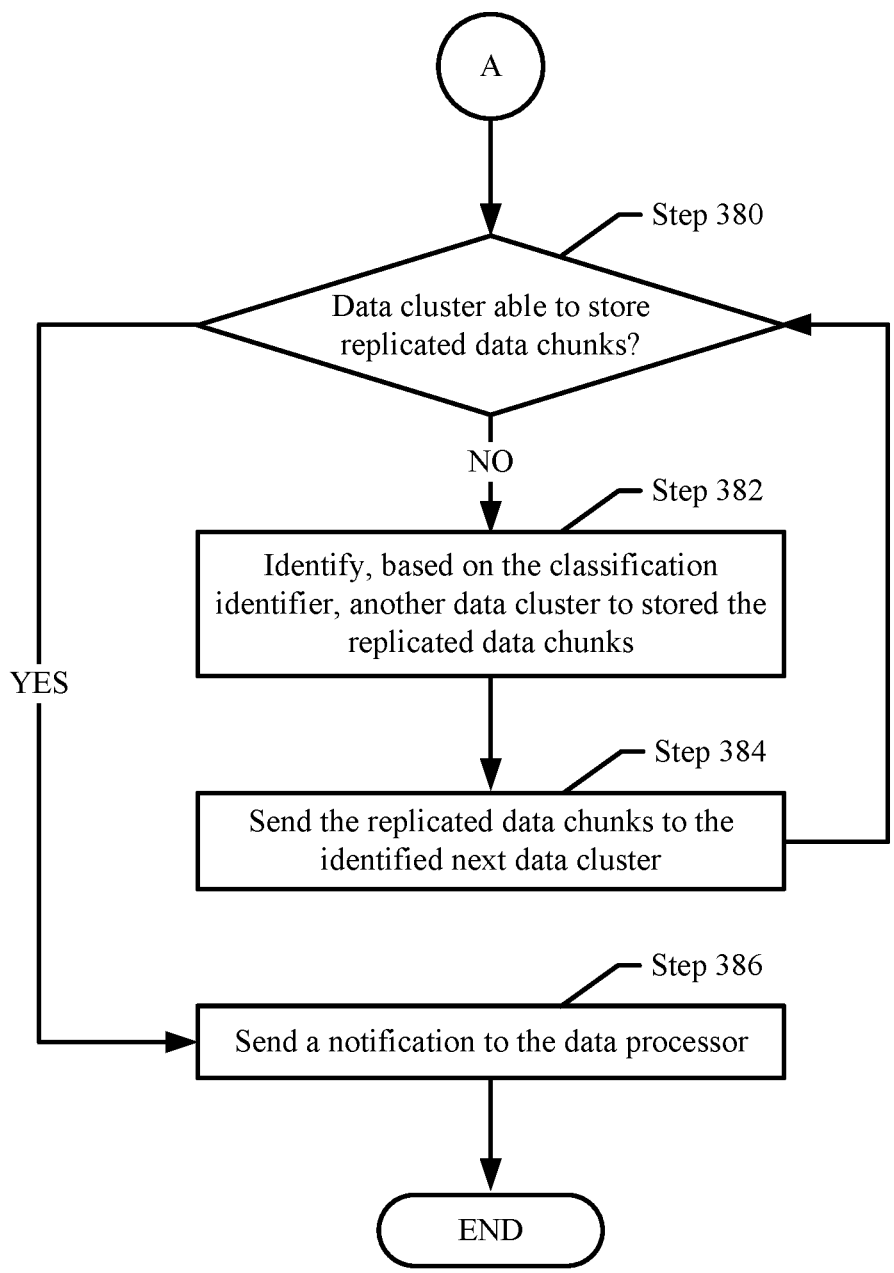

FIGS. 3F-3G show a flowchart of a method for replicating data with a compliance aware replicator in accordance with one or more embodiments of the invention. The method shown in FIGS. 3F-3G may be performed by, for example, a compliance aware replicator (CAR) (e.g., 120, FIG. 1A). Other components of the system illustrated in FIG. 1A may perform all or a portion of the method of FIGS. 3F-3G without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3F, in step 370, a replication request is obtained. In one or more embodiments of the invention, the data processor sends a message to the CAR. The message may include a request to replicate the data chunks and store the replicated data chunks in a data cluster specified by compliance information. The message may include an object identifier, sequencing metadata associated with the object, and the classification identifier associated with the data chunks as discussed above.

In step 372, data chunks are obtained using the sequence identifiers. In one or more embodiments of the invention, the CAR uses sequencing metadata to obtain the data chunks associated with the replication request. As discussed above, the sequencing metadata may include the data cluster identifier associated with the data cluster in which the data chunks were stored and sequencing identifiers associated a specific order of the data chunks. The CAR may send a message to the DAG of the data cluster where the data chunks are stored. The message may include a request for the data chunks that are associated with the sequence identifiers. In response to the request, the DAG obtains the data chunks and sends the data chunks to the CAR. The CAR may order to the data chunks by matching the sequence identifiers included in the data chunks with the order of sequence identifiers in the sequencing metadata. The data chunks may be obtained using the sequence identifiers via other and/or additional methods without departing from the invention.

In step 374, the data chunks are replicated. In one or more embodiments of the invention, the CAR generates replicated data chunks by making one or more copies of the data chunks. The replication request may specify the amount of replications of the data chunks to generate. The data chunks may be replicated via other and/or additional methods without departing from the invention.

In step 376, a data cluster to store the replicated data chunks is identified based on the classification identifier. In one or more embodiments of the invention, the CAR identifies data clusters that may store the replicated data chunks in accordance with compliance information using the classification identifier. As discussed above, the classification identifier may specify the data clusters that can store the replicated data chunks. The CAR may send a message to the data processor. The message may include a request for a list of data clusters in the system that are registered with the data processor. In response to the request, the data processor may generate a list of data cluster identifiers and send the list to the CAR. The CAR may compare the list of data cluster identifier with the of data cluster identifiers specified in the classification identifier and identify a data cluster associated with data cluster identifiers specified in the list of data cluster identifiers associated with the classification identifier as the data cluster to send the replicated data chunks. A data cluster to store the replicated data chunks may be identified based on the classification identifier via other and/or additional methods without departing from the invention.

In step 378, the replicated data chunks are sent to the identified data cluster. In one or more embodiments of the invention, the CAR sends a message to the DAG of the identified data cluster. The message may include a request to store the replicated data chunks. The request may be a copy of the request obtained from the data processor. The data processor may copy the request in the event that the identified next data cluster is unable to perform the request and the data processor is required to send the request to another data cluster. The message may also include the replicated data chunks. The multiple sets of replicated data chunks may be sent and stored in multiple data clusters without departing from the invention. The replicated data chunks may be sent to the identified data cluster via other and/or additional methods without departing from the invention.

Turning to FIG. 3G, in step 380, a determination is made as to whether the data cluster is able to store the replicated data chunks. In one or more embodiments of the invention, the DAG of the data cluster sends confirmation when a request is processed. The CAR may wait a predetermined amount of time to obtain the confirmation from the DAG of the data cluster. If the CAR waits the predetermined amount of time and does not receive confirmation from the DAG, the CAR may determine that the data cluster is unable to service the request. If the CAR obtains confirmation prior to the predetermined amount of time elapses, the CAR may determine that the data cluster is able to service the request. It may be determined whether the data cluster is able to store the replicated data chunks via other and/or additional methods without departing from the invention.

In another embodiment of the invention, the identified data cluster may be unavailable. The identified data cluster may have become unavailable at any time. The identified data cluster may have become unavailable due to network connection loss, power loss, and/or another or additional reasons without departing from the invention. If the identified data cluster is unavailable, then the CAR may determine that the data cluster is not able to service the request. If the data cluster is available, the CAR may wait for confirmation from the DAG of the data cluster to determine if the data cluster is able to service the request as described above. In the event that all data clusters are unavailable or are not able to store the replicated data chunks, the CAR may retry the data clusters until the replicated data chunks are stored or a predetermined period of time has passed since the first data cluster attempted to store the replicated data chunks. In scenarios in which no data cluster is able to store the replicated data chunks and a predetermined period of time has passed, the CAR may send a notification to the data processor that indicates that no data cluster was able to store the replicated data chunks.

If it is determined that the data cluster is able to store the replicated data chunks, then the method may proceed to step 386. If it is determined that the data cluster is not able to store the replicated data chunks, then the method may proceed to step 382.

In step 382, a next data cluster to store the replicated data chunks is identified based on the classification identifier. In one or more embodiments of the invention, the CAR identifies data clusters that may store the replicated data chunks in accordance with compliance information using the classification identifier. As discussed above, the classification identifier may specify the data clusters that can store the replicated data chunks. The CAR may send a message to the data processor. The message may include a request for a list of data clusters in the system that are registered with the data processor. In response to the request, the data processor may generate a list of data cluster identifiers and send the list to the CAR. The CAR may compare the list of data cluster identifier with the of data cluster identifiers specified in the classification identifier and identify a data cluster (other than the previous data cluster(s) which could not store the replicated data chunks) associated with data cluster identifiers specified in the list of data cluster identifiers associated with the classification identifier as the data cluster to send the replicated data chunks. A next data cluster to store the replicated data chunks may be identified based on the classification identifier via other and/or additional methods without departing from the invention.

In step 384, the replicated data chunks are sent to the identified next data cluster. In one or more embodiments of the invention, the CAR sends a message to the DAG of the identified data cluster. The message may include a request to store the replicated data chunks. The request may be a copy of the request obtained from the data processor. The data processor may copy the request in the event that the identified next data cluster is unable to perform the request and the data processor is required to send the request to another data cluster. The message may also include the replicated data chunks. The multiple sets of replicated data chunks may be sent and stored in multiple data clusters without departing from the invention. The replicated data chunks may be sent to the identified data cluster via other and/or additional methods without departing from the invention. The method may proceed to step 380 following step 384.

In step 386, a notification is sent to the data processor. In one or more embodiments of the invention, the CAR sends a message to the data processor. The message may include a notification. The notification may indicate that the replicated data chunks were successfully stored in the data cluster. A notification may be sent to the data processor via other and/or additional methods without departing from the invention.

The method may end following step 386.

Examples

Figure 4A:
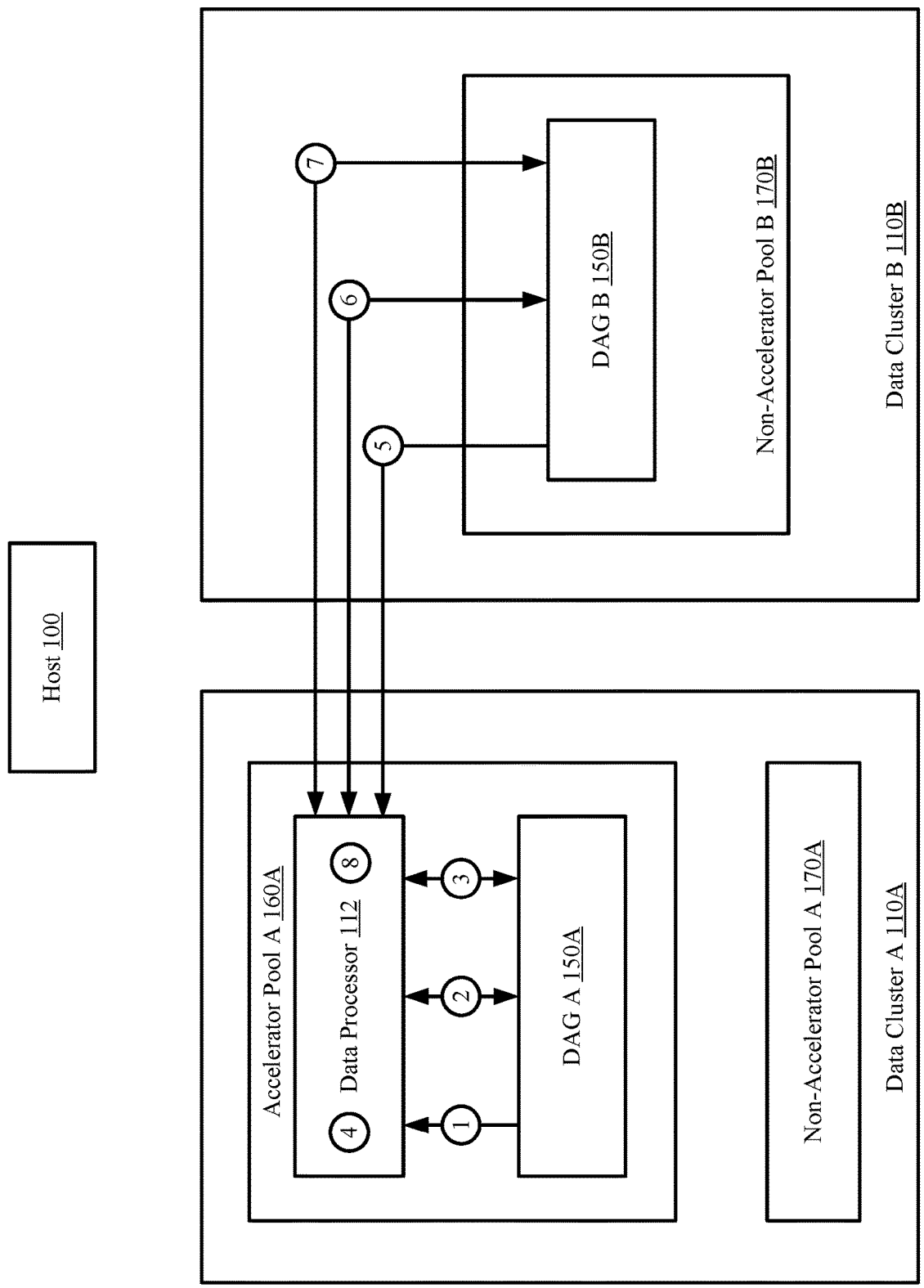
FIG. 4A shows a diagram of a first example in accordance with one or more embodiments of the invention.
Figure 4B:
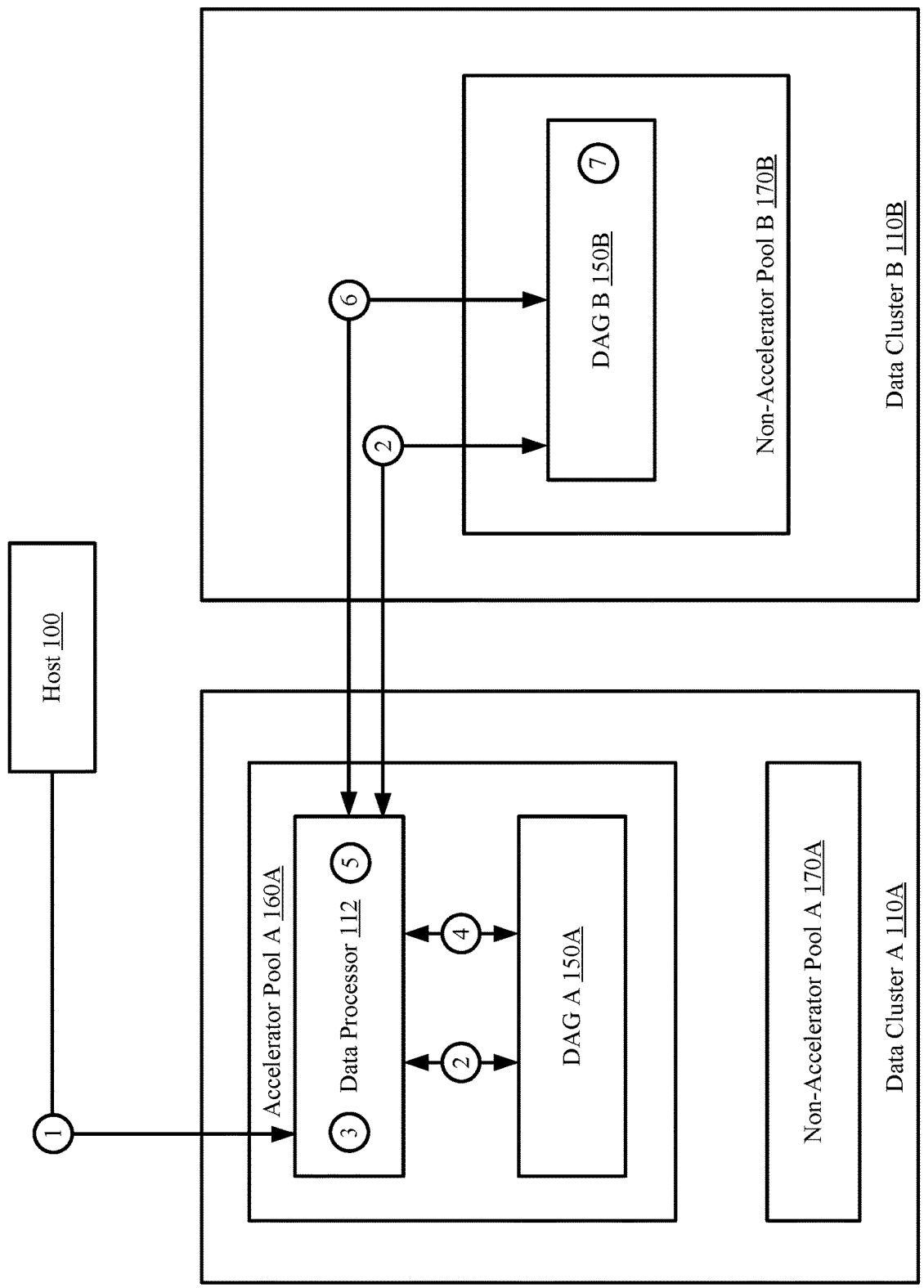
FIG. 4B shows a diagram of a second example in accordance with one or more embodiments of the invention.
Figure 4C:
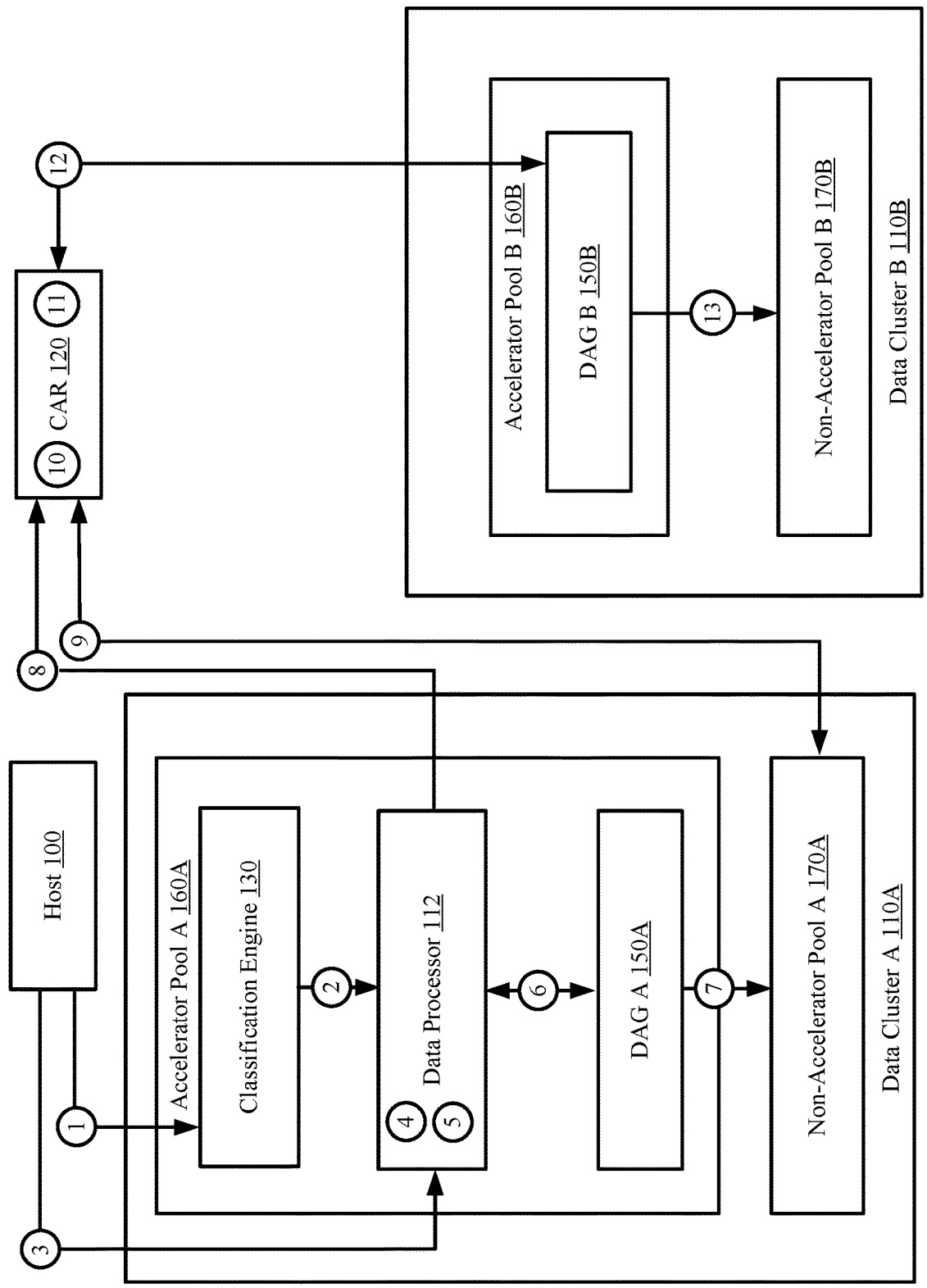
FIG. 4C shows a diagram of a third example in accordance with one or more embodiments of the invention.

The following section describes three examples. The examples are not intended to limit the invention. The examples are illustrated in FIGS. 4A-4C. Turning to the first example, consider a scenario in which a data processor registers a DAG.

FIG. 4A shows a diagram of a first example in accordance with one or more embodiments of the invention. The example system depicted in FIG. 4A includes a host (100) and two data clusters, data cluster A (110A) and data cluster B (110B). Data cluster A (110A) includes accelerator pool A (160A) and non-accelerator pool A (170A). Accelerator pool A (160A) includes a data processor (112) and DAG A (150A). Data cluster B (110B) includes non-accelerator pool B (170B). Non-accelerator pool B (170B) includes DAG B (150B).

At a first point in time, DAG A (150A) sends a registration request to the data processor (112) [1]. After obtaining the registration request, the data processor (112) sends a request for the data cluster identifier associated with DAG A (150A). In response to the request, DAG A (150A) obtains the data cluster identifier and sends the data cluster identifier to the data processor (112) [2]. Then, the data processor (112) sends a request to DAG A (150A) for DAG metadata associated with DAG A (150A). In response to the request, DAG A (150A) generates DAG metadata and sends the DAG metadata to the data processor (112) [3]. After obtaining both the data cluster identifier and DAG metadata, the data processor (112) generates a DAG identifier associated with DAG A (150A) and generates a DAG entry associated with DAG A (150A) that includes the DAG identifier, the data cluster identifier, and the DAG metadata associated with DAG A (150A) [4].

After that, DAG B (150B) sends a registration request to the data processor (112) [5]. After obtaining the registration request, the data processor (112) sends a request for the data cluster identifier associated with DAG B (150B). In response to the request, DAG B (150B) obtains the data cluster identifier and sends the data cluster identifier to the data processor (112) [6]. Then, the data processor (112) sends a request to DAG B (150B) for DAG metadata associated with DAG B (150B). In response to the request, DAG B (150B) generates DAG metadata and sends the DAG metadata to the data processor (112) [7]. After obtaining both the data cluster identifier and DAG metadata, the data processor (112) generates a DAG identifier associated with DAG B (150B) and generates a DAG entry associated with DAG B (150B) that includes the DAG identifier, the data cluster identifier, and the DAG metadata associated with DAG B (150B) [8].

Turning to the second example, consider a scenario in which a request from a host is served using cluster bidding counters. FIG. 4B shows a diagram of a second example in accordance with one or more embodiments of the invention. The example system depicted in FIG. 4B includes a host (100) and two data clusters, data cluster A (110A) and data cluster B (110B). Data cluster A (110A) includes accelerator pool A (160A) and non-accelerator pool A (170A). Accelerator pool A (160A) includes a data processor (112) and DAG A (150A). Data cluster B (110B) includes non-accelerator pool B (170B). Non-accelerator pool B (170B) includes DAG B (150B).

At a first point in time, the host (100) sends a request to the data processor (112) [1]. The request is a request to store data. In response to obtaining the request, the data processor (112) sends a request for the CBCs of each data cluster to DAG A (150A) and DAG B (150B). After obtaining the request, DAG A (150A) and DAG B (150B) generate CBCs and send the CBCs to the data processor (112) [2]. The data processor (112) then compares the CBCs and uses DAG metadata to find the DAG with the most available resources to service the request. Based on the CBCs and the DAG metadata, data cluster A (110A) has a higher availability of resources than data cluster B (110B) and DAG metadata indicates that both data cluster A (110A) and data cluster B (110B) may service the request, therefore, the data processor (112) identifies data cluster A (110A) as the data cluster to service the request [3].

After that, the data processor (112) sends the request to DAG A (150A) of data cluster A (110A). In response to obtaining the request, DAG A (150A) notifies the data processor (112) that data cluster A (110A) is unavailable [4]. The data processor (112) then determines to send the request to data cluster B (110B) [5]. The data processor (112) sends the request to DAG B (150B) of data cluster B (110B), and DAG B (150B) sends confirmation that data cluster B (110B) is able to service the request [6]. DAG B (150B) then manages the service of the request on data cluster B (110B) [7].

Turning to the third example, consider a scenario in which a CAR is replicating data chunks stored in data clusters of a system. FIG. 4C shows a diagram of a third example in accordance with one or more embodiments of the invention. The example system depicted in FIG. 4C includes a host (100) and two data clusters, data cluster A (110A) and data cluster B (110B), and a compliance aware replicator (CAR) (120). Data cluster A (110A) includes accelerator pool A (160A) and non-accelerator pool A (170A). Accelerator pool A (160A) includes a data processor (112), a classification engine (130), and DAG A (150A). Data cluster B (110B) includes an accelerator pool B (160B) and a non-accelerator pool B (170B). Accelerator pool B (160B) includes DAG B (150B).

At a first point in time, the host (100) sends compliance information to the classification engine (130) [1]. The classification engine (130) uses the compliance information to generate a classification identifier, and shares the classification identifier with the data processor (112) [2]. The host (100) then sends a request to the data processor (112) [3]. The request is a request to stored data of an object in a data cluster and includes the data of the object. After obtaining the request, the data processor (112) processes the data to obtain data chunks and generates sequencing metadata associated with the data chunks [4].

The data processor (112) then identifies data cluster A (110A) is to store the data chunks based on the classification identifier [5]. The data processor (112) then sends the data chunks to DAG A (150A) of data cluster A (110A), and DAG A (150A) notifies the data processor (112) that data cluster A is able to store the data chunks [6]. DAG A (150A) then stores the data chunks in a data node (not shown) of non-accelerator pool A (170A) [7]. After the data chunks are stored, the data processor (112) sends a replication request to the CAR (120) [8]. The request includes sequencing metadata and a compliance identifier associated with the data chunks. In response to obtaining the request, the CAR (120) obtains the data chunks using the sequencing metadata [9].

After obtaining the data chunks, the CAR (120) then replicates the data chunks to generate replicated data chunks [10]. The CAR (120) then determines to store the replicated data chunks in data cluster B (110B) based on the classification identifier associated with the data chunks [11]. The CAR (120) then sends the replicated data chunks to DAG B (150B), and DAG B (150B) notifies the CAR (120) that data cluster B (110B) is able to store the replicated data chunks [12]. DAG B (150B) then stores the replicated data chunks in a data node (not shown) of non-accelerator pool B (170B).

End of Examples

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to replicating data stored in a multiple cluster system using a compliance aware replicator (CAR) in a manner that meets compliance requirements. The CAR may use sequencing metadata and compliance metadata to obtain data chunks, replicate data chunks, and store data chunks in data clusters permitted based on classification requirements. Further, the compliance metadata may specify data clusters that may store replicated data chunks in accordance with compliance requirements and sequencing metadata may specify an order of the data chunks in which the CAR obtains and stores the replicated data chunks. The DAG operations may be used to improve the computational efficiency of preserving data stored in a multiple cluster system by replicating data chunks without manual intervention and ensuring uninterrupted replication of data chunks. Additionally, by including the sequence identifiers to the data chunks along with the classification identifiers, the CAR may not be required to generate or obtain from the data processor system wide metadata mappings that track the storage locations of data chunks stored in the system, thereby decreasing computational overhead associated with metadata mappings.

In traditional systems, the replication of data in a multiple cluster system may be performed manually by a data administrator. The data administrator may be required to keep track of data stored in the system and replicate data in a manner that is in accordance with the compliance requirements. This may get complicated in a multiple cluster system and may result in the inefficient use of computational resources used for replicating data. Embodiments of the invention improve the computational efficiency of replicating data stored in a data cluster by using a CAR to replicate and store data in accordance with compliance requirements.

Thus, embodiments of the invention may address the problem of inefficient use of computing resources to store and protect data in a multiple cluster system. This problem arises due to the technological nature of the environment in which the data of the data cluster is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for storing data, the method comprising:
obtaining, by a compliance aware replicator (CAR), a replication request to replicate data; and
in response to the replication request:
obtaining data chunks, associated with the data, using sequence identifiers of sequencing metadata;
replicating the data chunks to obtain replicated data chunks;
identifying, using classification metadata associated with the data, a first data cluster of data clusters to store the replicated data chunks; and
sending the replicated data chunks to the first data cluster.

2. The method of claim 1, further comprising:
prior to obtaining, by the CAR, the replication request:

obtaining, by a data processor, a request from a host, wherein the request specifies the data;
in response to the request:
processing the data to obtain the data chunks;
associating a classification identifier with the data chunks, wherein the classification metadata comprises the classification identifier;
generating and including sequence identifiers with the data chunks;
obtaining cluster bidding counters (CBCs) associated with the data clusters;
identifying a second data cluster of the data clusters to service the request based on the CBCs;
sending the request and the data chunks to the second data cluster.

3. The method of claim 2, wherein processing the data may comprise performing one selected from a group consisting of:
erasure coding; and
deduplication.

4. The method of claim 2, wherein a CBC of the CBCs specifies computational resources available in the second data cluster of the data cluster to service requests.

5. The method of claim 2, further comprising:
prior to obtaining, by the data processor, the request from the host:
obtaining, by a classification engine, compliance information from the host;
generating the classification identifier based on the compliance information; wherein the classification metadata comprises the classification identifier.

6. The method of claim 5, wherein the classification identifier specifies the first data cluster is permitted to store the replicated data chunks.

7. The method of claim 1, wherein the sequence identifiers specify an order associated with the data chunks.

8. A system for storing data, comprising:
a processor;
a compliance aware replicator (CAR), which when executed by the processor performs a method, the method comprising:
obtaining, by the CAR, a replication request to replicate data; and
in response to the replication request:
obtaining data chunks, associated with the data, using sequence identifiers of sequencing metadata;
replicating the data chunks to obtain replicated data chunks;
identifying, using classification metadata associated with the data, a first data cluster of data clusters to store the replicated data chunks; and
sending the replicated data chunks to the first data cluster.

9. The system of claim 8, wherein the method further comprises:
prior to obtaining, by the CAR, the replication request:
obtaining, by a data processor, a request from a host, wherein the request specifies the data;
in response to the request:
processing the data to obtain the data chunks;
associating a classification identifier with the data chunks, wherein the classification metadata comprises the classification identifier;
generating and including sequence identifiers with the data chunks;
obtaining cluster bidding counters (CBCs) associated with the data clusters;
identifying a second data cluster of the data clusters to service the request based on the CBCs;
sending the request and the data chunks to the second data cluster.

10. The system of claim 9, wherein processing the data may comprise performing one selected from a group consisting of:
erasure coding; and
deduplication.

11. The system of claim 9, wherein a CBC of the CBCs specifies computational resources available in the second data cluster of the data cluster to service requests.

12. The system of claim 9, wherein the method further comprises:
prior to obtaining, by the data processor, the request from the host:
obtaining, by a classification engine, compliance information from the host;
generating the classification identifier based on the compliance information; wherein the classification metadata comprises the classification identifier.

13. The system of claim 12, wherein the classification identifier specifies the first data cluster is permitted to store the replicated data chunks.

14. The system of claim 8, wherein the sequence identifiers specify an order associated with the data chunks.

15. A non-transitory computer readable medium comprising computer readable program code, which when executed by a computer processor enables the computer processor to perform a method for storing data, the method comprising:
obtaining, by a compliance aware replicator (CAR), a replication request to replicate data; and
in response to the replication request:
obtaining data chunks, associated with the data, using sequence identifiers of sequencing metadata;
replicating the data chunks to obtain replicated data chunks;
identifying, using classification metadata associated with the data, a first data cluster of data clusters to store the replicated data chunks; and
sending the replicated data chunks to the first data cluster.

16. The non-transitory computer readable medium of claim 15, wherein the method further comprises:
prior to obtaining, by the CAR, the replication request:
obtaining, by a data processor, a request from a host, wherein the request specifies the data;
in response to the request:
processing the data to obtain the data chunks;
associating a classification identifier with the data chunks, wherein the classification metadata comprises the classification identifier;
generating and including sequence identifiers with the data chunks;
obtaining cluster bidding counters (CBCs) associated with the data clusters;
identifying a second data cluster of the data clusters to service the request based on the CBCs;
sending the request and the data chunks to the second data cluster.

17. The non-transitory computer readable medium of claim 16, wherein processing the data may comprise performing one selected from a group consisting of:
erasure coding; and
deduplication.

18. The non-transitory computer readable medium of claim 16, wherein a CBC of the CBCs specifies computational resources available in the second data cluster of the data cluster to service requests.

19. The non-transitory computer readable medium of claim 16, wherein the method further comprises:
prior to obtaining, by the data processor, the request from the host:
obtaining, by a classification engine, compliance information from the host;
generating the classification identifier based on the compliance information; wherein the classification metadata comprises the classification identifier.

20. The non-transitory computer readable medium of claim 19, wherein the classification identifier specifies the first data cluster is permitted to store the replicated data chunks.

* * * * *